US008307172B2

(12) United States Patent
Ito

(10) Patent No.: US 8,307,172 B2
(45) Date of Patent: Nov. 6, 2012

(54) MEMORY SYSTEM INCLUDING MEMORY CONTROLLER AND SEPARATELY FORMATTED NONVOLATILE MEMORY TO AVOID "COPY-INVOLVING WRITE" DURING UPDATING FILE DATA IN THE MEMORY

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 12/388,089

(22) Filed: Feb. 18, 2009

(65) Prior Publication Data

US 2009/0248963 A1 Oct. 1, 2009

(30) Foreign Application Priority Data

Mar. 28, 2008 (JP) ................................. 2008-087757

(51) Int. Cl.
*G06F 13/00* (2006.01)
(52) U.S. Cl. ........ 711/156; 711/103; 711/155; 711/158; 711/165
(58) Field of Classification Search .................. 711/103, 711/155, 156, 152, 165
See application file for complete search history.

(56) References Cited

U.S. PATENT DOCUMENTS

| | | | | |
|---|---|---|---|---|
| 6,813,678 | B1 * | 11/2004 | Sinclair et al. | 711/103 |
| 7,137,027 | B2 * | 11/2006 | Shiota et al. | 714/5.1 |
| 7,523,013 | B2 * | 4/2009 | Gorobets et al. | 702/177 |
| 7,840,836 | B2 * | 11/2010 | Chang | 714/5.11 |
| 2006/0282610 | A1 * | 12/2006 | Dariel et al. | 711/103 |
| 2007/0043924 | A1 | 2/2007 | Ito et al. | |
| 2008/0098161 | A1 | 4/2008 | Ito | |
| 2008/0172427 | A1 | 7/2008 | Ito | |
| 2008/0215802 | A1 * | 9/2008 | Chow et al. | 711/103 |
| 2008/0288814 | A1 * | 11/2008 | Kitahara | 714/5 |
| 2009/0013148 | A1 * | 1/2009 | Eggleston | 711/203 |
| 2009/0132755 | A1 * | 5/2009 | Radke | 711/103 |
| 2009/0198882 | A1 * | 8/2009 | Ji et al. | 711/109 |
| 2009/0248961 | A1 * | 10/2009 | Chu et al. | 711/103 |

FOREIGN PATENT DOCUMENTS

| | | |
|---|---|---|
| JP | 2001-43691 | 2/2001 |
| JP | 2006-23980 | 1/2006 |
| JP | 2006-40264 | 2/2006 |
| JP | 2006-48746 | 2/2006 |
| JP | 2006-215954 | 8/2006 |
| JP | 2008-171257 | 7/2008 |

OTHER PUBLICATIONS

Office Action issued Mar. 22, 2011, in Japan Patent Application No. 2008-087757 (with English translation).

* cited by examiner

*Primary Examiner* — Reba I Elmore
(74) *Attorney, Agent, or Firm* — Oblon, Spivak, McClelland, Maier & Neustadt, L.L.P.

(57) ABSTRACT

A memory system includes a nonvolatile memory including a memory space of logical addresses which is formatted from outside by an additional-write type file system, and a memory controller controlling the nonvolatile memory, the memory controller transmitting n error to the outside of the system if the memory controller is instructed to write data in a logical address which is equal to or smaller than a logical address of previously written data in an address area of the memory space. The memory controller controls the logical address and a physical address of the nonvolatile memory, and in conjunction with the additional-write type file system makes it possible to avoid "copy-involving write" each time file data in the nonvolatile memory is updated, thereby to promote high-speed operation by prevention of decrease in file update speed.

16 Claims, 21 Drawing Sheets

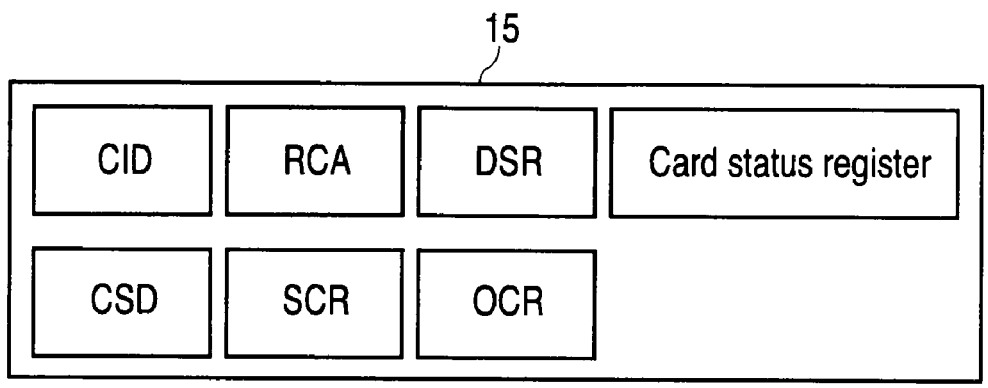
F I G. 2
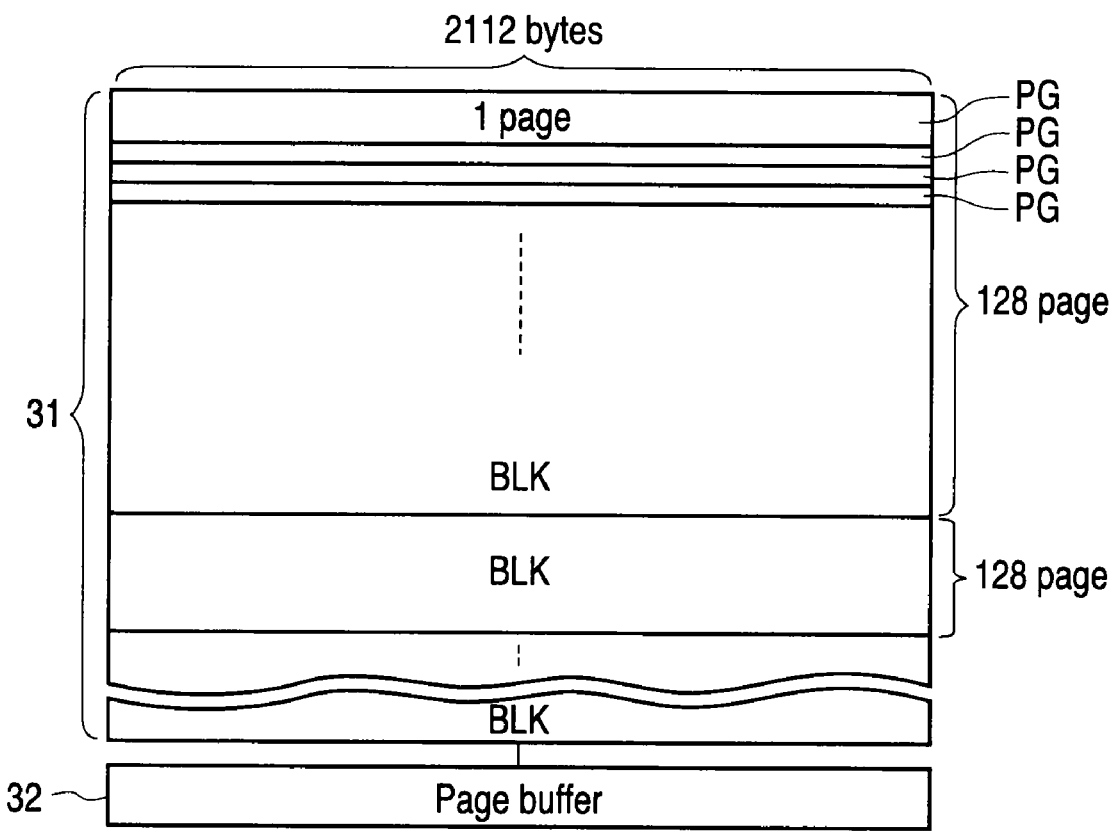
F I G. 3

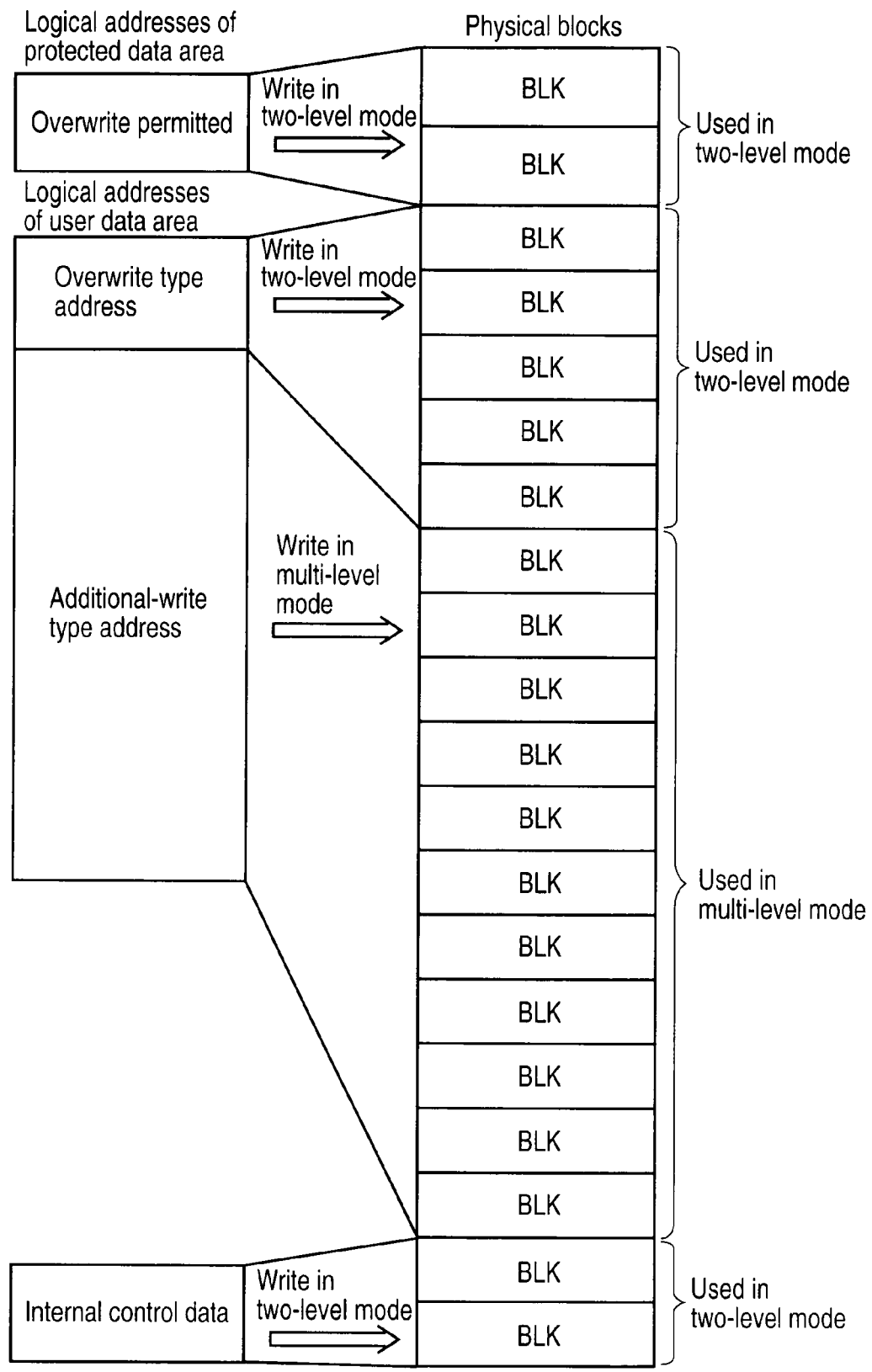
F I G. 11

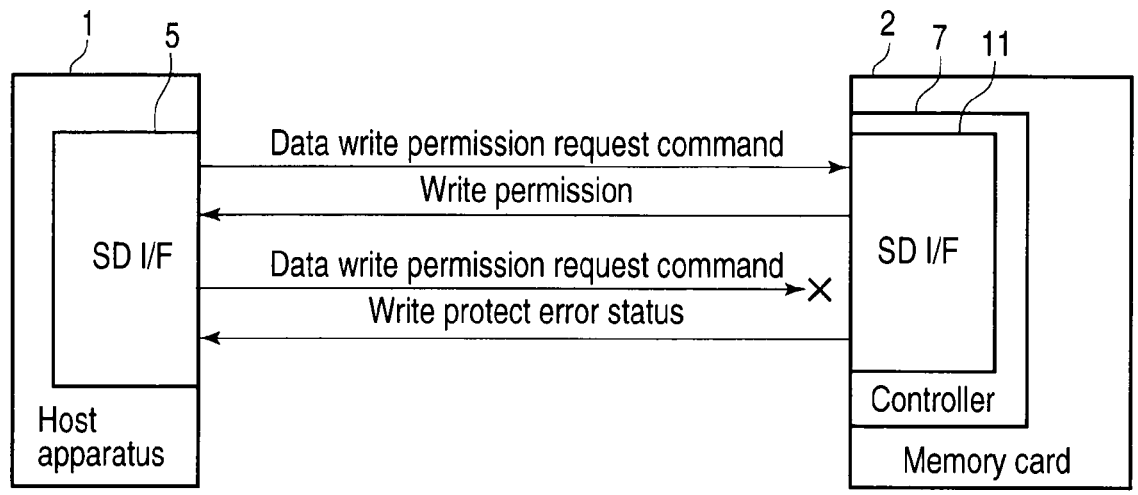
F I G. 1 4
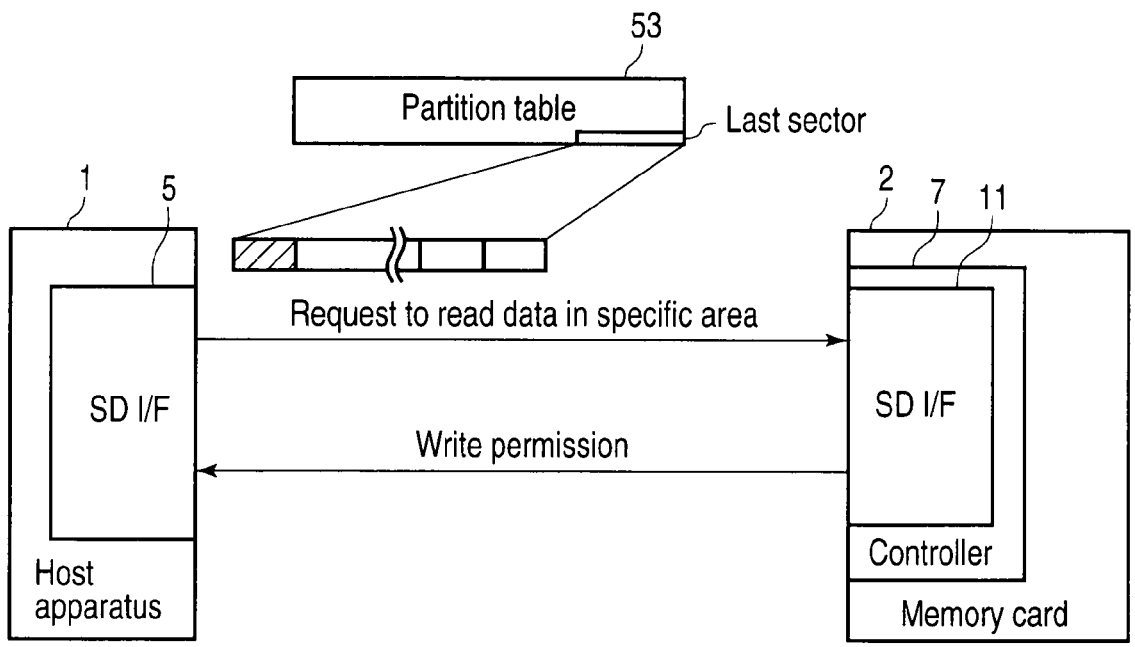
F I G. 1 5

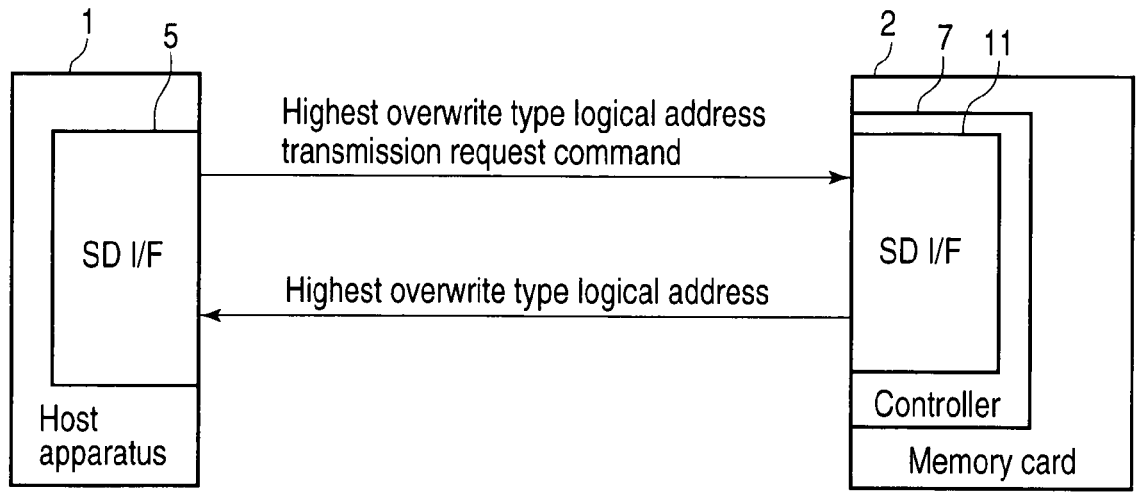
F I G. 1 6
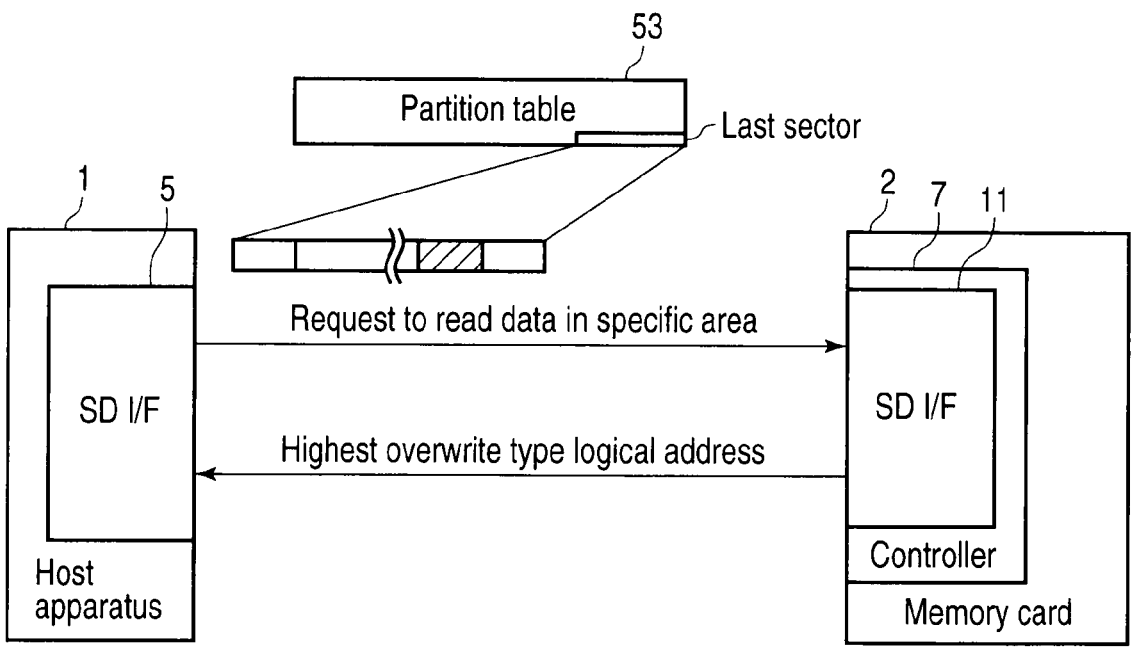
F I G. 1 7

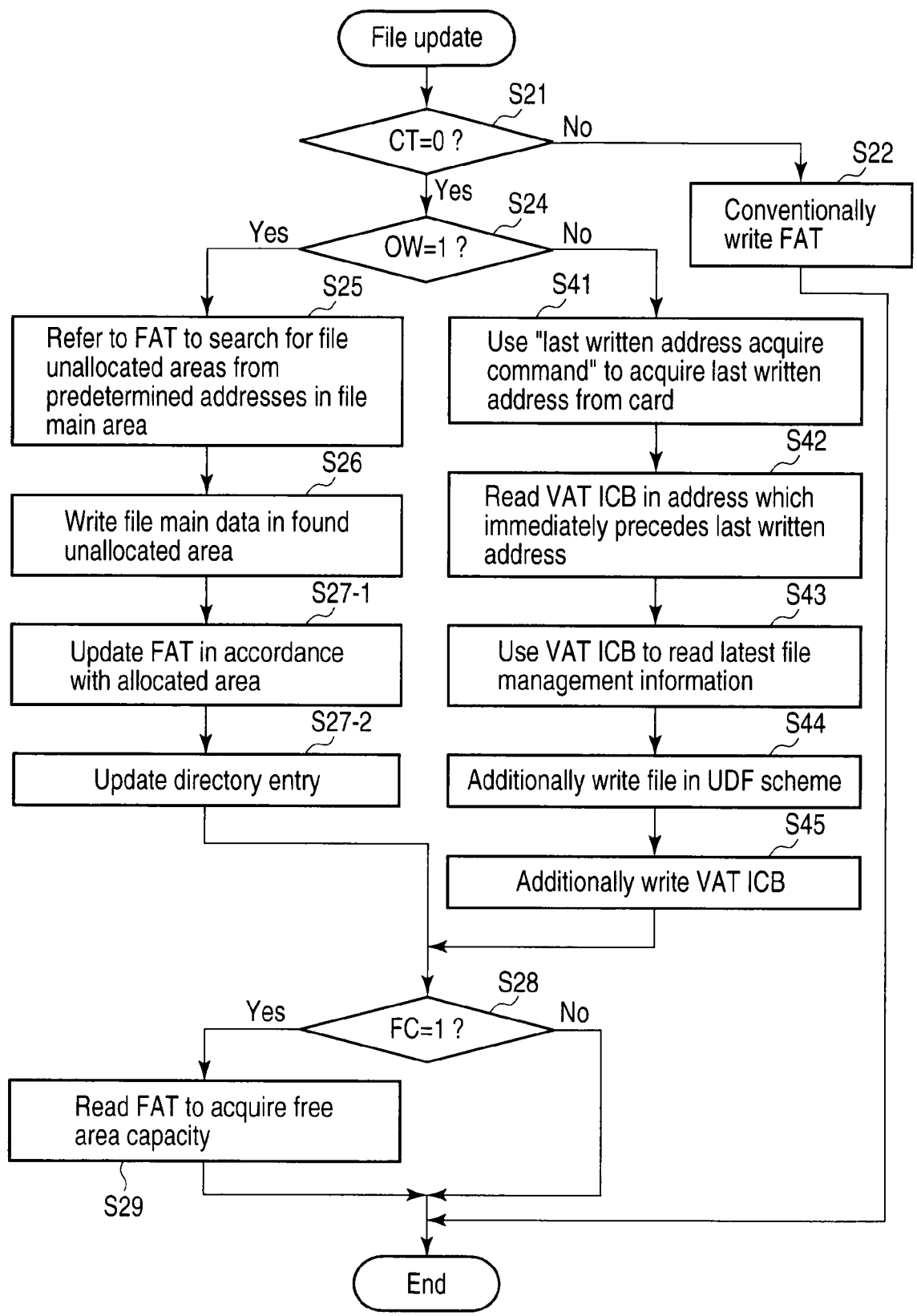
F I G. 2 4

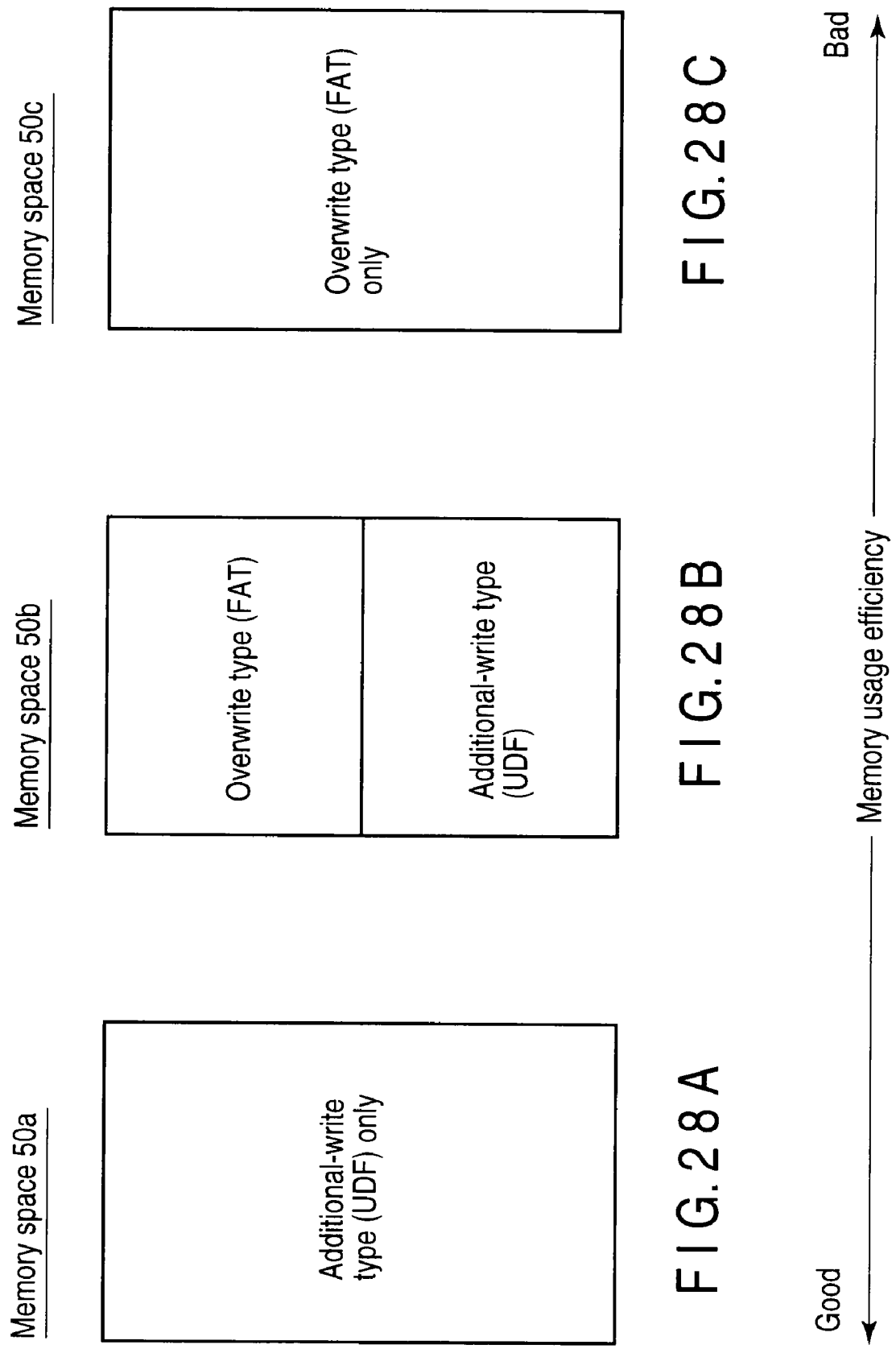

MEMORY SYSTEM INCLUDING MEMORY CONTROLLER AND SEPARATELY FORMATTED NONVOLATILE MEMORY TO AVOID "COPY-INVOLVING WRITE" DURING UPDATING FILE DATA IN THE MEMORY

CROSS-REFERENCE TO RELATED APPLICATIONS

This application is based upon and claims the benefit of priority from prior Japanese Patent Application No. 2008-087757, filed Mar. 28, 2008, the entire contents of which are incorporated herein by reference.

BACKGROUND OF THE INVENTION

1. Field of the Invention

The present invention relates to a memory controller and a memory system.

2. Description of the Related Art

At present, a memory system typically represented by a memory card using a nonvolatile semiconductor memory such as a flash memory is used for recording music data and video data. A typical flash memory used in such memory system includes a NAND flash memory. In the NAND flash memory, write is performed in units called pages each constituted of more than one bit. Erasure is only performed in units called blocks constituted by more than one page. For this reason, for partially updating a block, new data to be updated must be written in a new block and sustained data must be copied from the old block containing the old data, which is to be updated to the new data, into the new block. This process is called "copy-involving write". Since the "copy-involving write" accompanies copying of sustained data, frequent "copy-involving write" operations considerably increase overheads.

A file allocation table (FAT) file system is used as an overwrite type file system to manage data stored in a storage medium (see Jpn. Pat. Appln. KOKAI Publication No. 2006-040264). The FAT file system allocates data to clusters, which correspond to units of write areas used by the file system, and uses a table called a FAT to manage allocation of the data to the clusters. The FAT file system is based on a medium, such as a hard disk, on which data can be rapidly updated at random. Random write is a scheme in which data is written in free clusters at random independently of an address of each cluster.

In the FAT file system, update of management data such as the FAT occurs each time file data (real data) constituting files is updated. For this reason, when the FAT file system is employed for managing a NAND flash memory, "copy-involving write" occurs each time file data is updated, which tends to decrease the speed in file write.

The larger the capacity of the NAND flash memory becomes, the larger the size of a block becomes in the future. As a result, it is expected to exacerbate an adverse effect such as an increase in process time for "copy-involving write" or the like.

BRIEF SUMMARY OF THE INVENTION

According to an aspect of the present invention, there is provided a memory system comprising: a nonvolatile memory including a memory space which is formatted from outside by an additional-write type file system; and a memory controller controlling the nonvolatile memory, the memory controller transmitting a write protect error when the memory controller is instructed to write data in an address which is equal to or smaller than an address of previously written data in an address area of the memory space.

According to an aspect of the present invention, there is provided a memory controller controlling a memory, the memory controller transmitting a write protect error when the memory controller is instructed to write data in an address which is equal to or smaller than an address of previously written data in an address area of the memory space in the memory.

BRIEF DESCRIPTION OF THE SEVERAL VIEWS OF THE DRAWING

FIG. 2 is a diagram illustrating a configuration of a register;
FIG. 3 is a diagram showing a configuration of a memory space of a memory;
FIG. 11 is a diagram showing a correspondence between a controller write type and a write mode;
FIG. 14 is a diagram showing a configuration to authenticate data write permission;
FIG. 15 is a diagram showing a configuration to authenticate data write permission;
FIG. 16 is a diagram showing a configuration for a host to acquire a highest overwrite-type logical address;
FIG. 17 is a diagram showing a configuration for a host to acquire the highest overwrite-type logical address;
FIG. 24 is a flow chart of an allocation by an additional-write type file system;
FIG. 28A is a diagram for illustrating a correspondence between a formatted memory area and a memory usage efficiency;

FIG. 28B is a diagram for illustrating a correspondence between a formatted memory area and a memory usage efficiency; and FIG. 28C is a diagram for illustrating a correspondence between a formatted memory area and a memory usage efficiency.

DETAILED DESCRIPTION OF THE INVENTION

Figure 1:
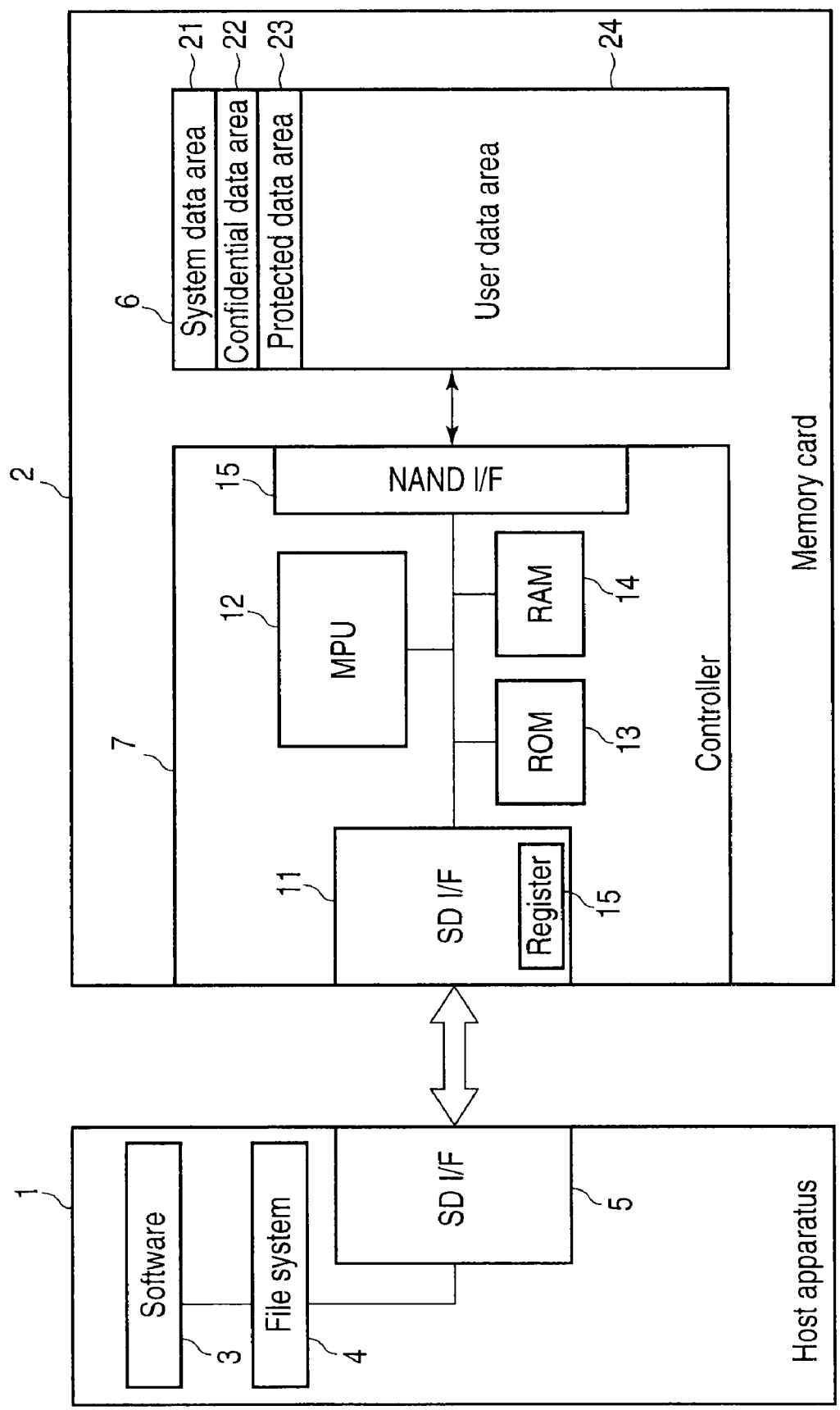
FIG. 1 is a functional block diagram of a memory system.

Embodiments of the present invention will now be described with reference to the accompanying drawings. Note that the same reference numerals denote the same components across drawings. Explanation will be given of a memory card as an example of a memory system.

[1] Configuration

[1-1] Overall Configuration

FIG. 1 is a functional block diagram schematically showing main parts of a memory system and a host device according to one embodiment of the invention. Each functional block can be realized as hardware, computer software, or a combination thereof. For clarifying the interchangeability, each block will be generally described below in terms of its function. These functions may be realized as hardware or software depending on design constraints imposed on a specific embodiment or an entire system. A person skilled in the art can realize these functions through various ways in each specific embodiment. However, such selection is included in the spirit and scope of the present invention.

As shown In FIG. 1, a host device (referred to as "host" hereinafter) 1 includes hardware and software (system) to access a memory card 2 to be inserted therein. Host 1 includes software such as that for an application and an operating system. Software 3 receives instruction by a user to write and read data in and from memory card 2. Software 3 commands a file system 4 to write and read data.

File system 4 is a mechanism for managing files (data) stored on a storage medium to be managed, stores management information in a storage area of the storage medium, and uses it to manage files. File system 4 specifies how to construct directory information for files or folders in the storage medium, how to move or delete files or folders, a data recording scheme, a position and a usage of an area which holds the management information, and the like. File system 4 is based on a FAT file system, and is configured to enable operations described through the present specification. Specific operations will be described below.

Host 1 has an SD interface 5. SD interface 5 is constituted by hardware and software for performing an interface process between host 1 and memory card 2 (controller 7). Host 1 communicates with memory card 2 through SD interface 5. SD interface 5 regulates various agreements for enabling host 1 and memory card 2 communicating with each other, and includes a set of various commands which can also be recognized by an SD interface 11 (to be described later) of memory card 2. SD interface 5 includes a hardware configuration (such as an arrangement of pins and the number of pins) by which it connects to SD interface 11 of memory card 2.

When memory card 2 is connected to host 1 or receives power on turning on off-state host 1 containing memory card 2, memory card 2 is initialized and then performs processes in accordance with access by host 1. Memory card 2 has a NAND flash memory 6 and a controller 7 for controlling memory 6.

Memory 6 stores and reads data in a nonvolatile manner in units called pages, each of which is constituted by memory cells. Each page is allocated with a physical address unique to the page. Memory 6 erases data in units called physical blocks, each of which is constituted by pages. One physical address may be allocated to one physical block.

Controller 7 manages a storage state of data stored in memory 6. Management of the storage state refers to management of a relationship between a physical address of a page (or physical block) and a logical address, which is allocated by host 1, of data contained in the page, and management of which page (or physical block) is in an erased state (contains no or invalid data).

Controller 7 includes SD interface 11, a micro processing unit (MPU) 12, a read only memory (ROM) 13, a random access memory (RAM) 14, and a NAND interface 15.

SD interface 11 is constituted by hardware and software for an interface process between host 1 and controller 7. Memory card 2 (controller 7) communicates with host 1 through SD interface 11. SD interface 11 regulates agreements for enabling communication between memory card 2 and host 1, includes a set of various commands, and includes a hardware configuration (such as an arrangement of pins and the number of pins), like SD interface 5.

SD interface 11 includes a register 15. FIG. 2 illustrates a configuration of register 15. Register 15 has various registers such as a card status register, a CID, an RCA, a DSR, a CSD, an SCR, and an OCR. The card status register is used in a normal operation, and stores error information, for example. The CID, the RCA, the DSR, the CSD, the SCR, and the OCR are mainly used on initialization of memory card 2. An identification number of memory card 2 is stored in the CID (card identification number). A relative card address is stored in the RCA (relative card address). A bus drive power or the like of memory card 2 is stored in the DSR (driver storage register). A characteristic parameter of memory card 2 is stored in the CSD (card specific data). A data arrangement of memory card 2 is stored in the SCR (SD configuration data register). In the OCR (operation condition register), an operation voltage is stored when the operation voltage range of memory card 2 is limited.

MPU 12 controls the overall operation of memory card 2. MPU 12, for example, upon receipt of power, reads firmware (control program) stored in ROM 13 on RAM 14 to execute predetermined processes. MPU 12 constructs various tables (to be described later) on RAM 14 according to the control program and receives write commands, read commands, and erase commands from host 1 to execute processes on memory 6 in accordance with the commands.

ROM 13 stores a control program or the like controlled by MPU 12. RAM 14 is used as a work area for MPU 12 and stores control programs and various tables. The tables include a conversion table (logical-physical table) of physical addresses of pages on which data having logical addresses allocated to the data by file system 4 is actually stored. NAND interface 15 performs an interface process between controller 7 and memory 6.

A storage area in memory 6 is divided into several areas in accordance with types of data to be held. The areas include a system data area 21, a confidential data area 22, a protected data area 23, and a user data area 24.

System data area 21 is reserved in memory 6 to store data required by controller 7 for its operation, mainly stores management information related to memory card 2, and stores card information such as security information or a media ID of memory card 2. Confidential data area 22 stores key information for encryption or confidential data for authentication, and is not accessible by host 1.

Protected data area 23 stores important data or secure data. Host 1 can access protected data area 23 only after host 1 is authenticated through authentication between host 1 and memory card 2.

User data area 24 can be freely accessed or used by host 1, and stores user data such as AV content files and image data. In the following, it is assumed that memory 6 indicates user data area 24. Note that controller 7 reserves a part of user data area 24 to store control data (logical-physical table, a last allocated logical block address, which will be described later, and the like) required by controller 7 for its operation. Protected data area 23 and user data area 24 are logically formatted as different volumes by host 1 and are managed.

[1-2] Memory Configuration

Figure 4:
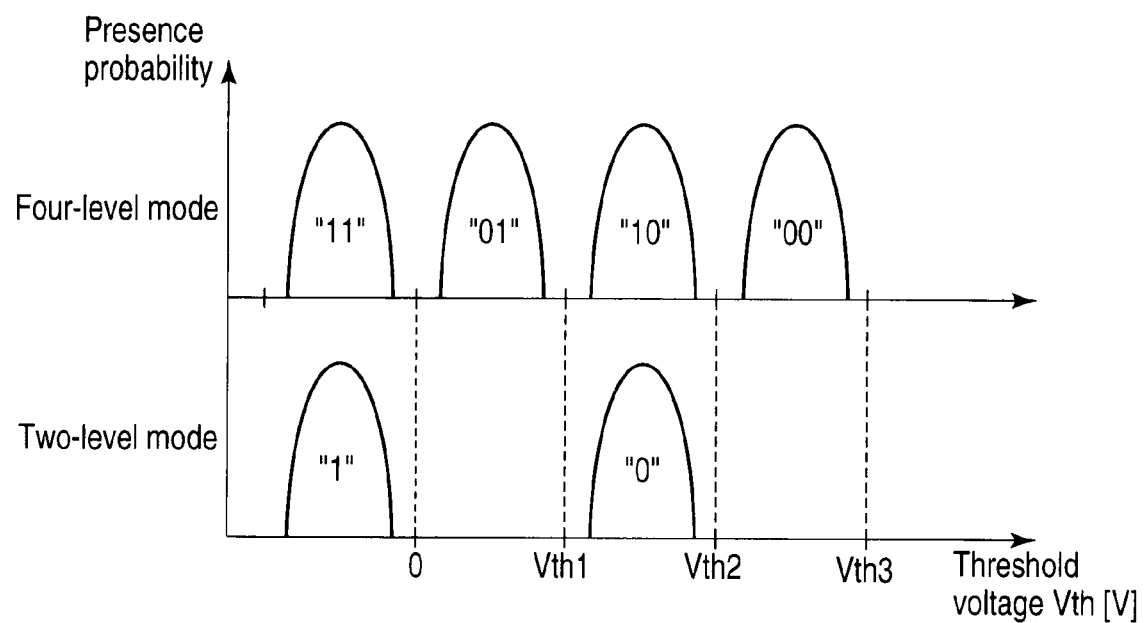
FIG. 4 is a diagram showing a two-level mode and a multi-level mode.

A memory configuration will now be described with reference to FIGS. 3 and 4.

[1-2-1] Memory Space and Physical Configuration of Memory

A configuration of the memory space of memory 6 will be described with reference to FIG. 3. FIG. 3 is a diagram showing the configuration of the memory space of memory 6.

As shown in FIG. 3, memory 6 has a normal memory area 31 and a page buffer 32.

Memory area 31 includes blocks BLK. Each physical block BLK is constituted by pages PG. Each page PG includes serially-connected memory transistors.

Each memory cell is constituted by a so-called stacked-gate structure metal oxide semiconductor field effect transistor (MOSFET). Each stacked-gate structure MOS transistor includes a tunnel insulating film, a floating gate electrode, an inter-electrode insulating film, a control gate electrode, and source/drain diffusion layers. Each memory cell transistor has a threshold voltage that varies depending on the number of electrons taken in the floating gate electrode, and stores information in accordance with threshold voltages. Each memory cell transistor can take more than two different thresholds, and can store so-called multi-level data. A control circuit including a sense amplifier, a potential generating circuit, and the like of memory 6 is configured to write and read multi-bit data in and from the memory cell transistor.

Control gate electrodes of the memory cell transistors belonging to the same row are connected to the same word line. Selection gate transistors are provided at both ends of the serially-connected memory cell transistors belonging to the same column. One of the selection gate transistors is connected to a bit line. In accordance with the rules, the memory cell transistors, the selection gate transistors, the word line, and the bit line are arranged. Data is written and read in units of sets of memory cell transistors, and a storage area constituted by each set of the memory cell transistors corresponds to one page.

In the example in FIG. 3, each page PG has 2112 bytes ((512 bytes of a data storage unit×4)+(10 bytes of a redundant unit×4)+(24 bytes of a management data storage unit)), and each block BLK is constituted by, for example, 128 pages.

Page buffer 32 inputs and outputs data to and from memory 6 and temporarily holds data. Page buffer 32 can hold, for example, data of 2112 bytes (2048 bytes+64 bytes), like page PG. In data write or the like, page buffer 32 inputs and outputs data to and from memory 6 in units of one page, corresponding to its own storage capacity. Data is erased in units of physical blocks BLK.

Memory 6 has a mode which writes 1-bit data in one memory cell transistor and a mode which writes multi-bit data, i.e., $2^n$-(n being a natural number) level. The mode which writes 1-bit data in one memory cell transistor is called a two-level mode, and the mode which writes multi-bit data is called a multi-level mode.

[1-2-2] Write Mode for Memory

Description will be given of the single-level mode and the multi-level mode with reference to FIG. 4. FIG. 4 is a diagram showing a difference between the two-level mode and the multi-level mode. As described above, each memory cell transistor of memory 6 can store data of at least two bits. More specifically, $2^n$-level data (n being a natural number) can be stored. In the following explanation, a four-level mode will be described as an example for the multi-level mode. In FIG. 4, the abscissa indicates a threshold voltage Vth, and the ordinate denotes a probability of existence of the memory cell.

First, description will be given of the four-level mode. As shown in FIG. 4, a memory cell transistor can hold any one of four kinds of data, that is, "11", "01", "10", and "00", which are associated with increasing four different threshold voltages. A memory cell transistor which holds "11" data has a threshold voltage Vth [V] of Vth<0V. A memory cell transistor which holds "01" data has a threshold voltage Vth [V] of 0V<Vth<Vth1. A memory cell transistor which holds "10" data has a threshold voltage Vth [V] of Vth1<Vth<Vth2. A memory cell transistor which holds "00" data has a threshold voltage Vth [V] of Vth2<Vth<Vth3.

Description will now be given of the two-level mode. As shown in FIG. 4, a memory cell transistor can hold one of two kinds of data, that is, "1" and "0" that are associated with the lower and higher threshold voltages, respectively. A memory cell transistor which holds "1" data has a threshold voltage Vth [V] of Vth<0V. A memory cell transistor which holds "0" data has a threshold voltage Vth [V] of Vth1<Vth<Vth2.

The data "1" has a threshold voltage equal to that of the data "11" in the four-level mode, and the data "0" has a threshold voltage equal to that of the data "10" in the four-level data. It can be said that the two-level mode uses only the lower bit of two-bit data in the four-level mode. Memory 6 writes data in the memory cell transistor in the two-level mode or in the four-level mode in accordance with a designation from controller 7. More specifically, a lower page address is allocated to the lower bit of two-bit data, and an upper page address is allocated to the higher bit. When data is to be written in the memory cell transistor in the two-level mode, controller 7 uses only the lower page address of the page addresses to write the data in memory 6. When data is to be written in the memory cell transistor in the multi-level mode, controller 7 uses both the upper and lower page addresses to write the data in memory 6.

Data is written in the lower bit first. Assume that "11" represents the erased state, "0" or "1" is written in the lower bit to cause the memory cell transistor to hold "11" ("–11") or "10" ("–0"). Here, "–" means indefiniteness. In the two-level mode, the write ends here.

On the other hand, when data is written in the four-level mode, subsequently "0" or "1" is written in the higher bit. As a result, the memory cell transistor which held "11" ("–1) now holds "11" or "01", and the memory cell transistor which held "10" ("–0") now holds "10" or "00". Similar rules are applied to an eight-level mode and a sixteen-level mode.

The multi-level mode realizes a higher data storage capacity of a memory cell, and with a low write speed. On the other hand, the two-level mode realizes a lower data storage capacity, a high write speed, and high resistance to frequent rewrites.

Memory 6 can select the two-level mode write or multi-level mode write in units of physical blocks.

The idea of modes may be extended to not only the four-level mode but also an eight-level mode (three bits per memory cell) or a sixteen-level mode (four bits per memory cell). In any case, the smaller the number of bits for a memory cell, the faster the write speed and the higher the resistance to frequent rewrites.

[1-2-3] Format of Memory

A format of memory card 2 will now be described. Memory 6 is formatted as follows. Formatting is performed by a file system (for example, file system 4 in host 1) according to one embodiment of the invention.

[1-2-3-1] FAT File System

Figure 5:
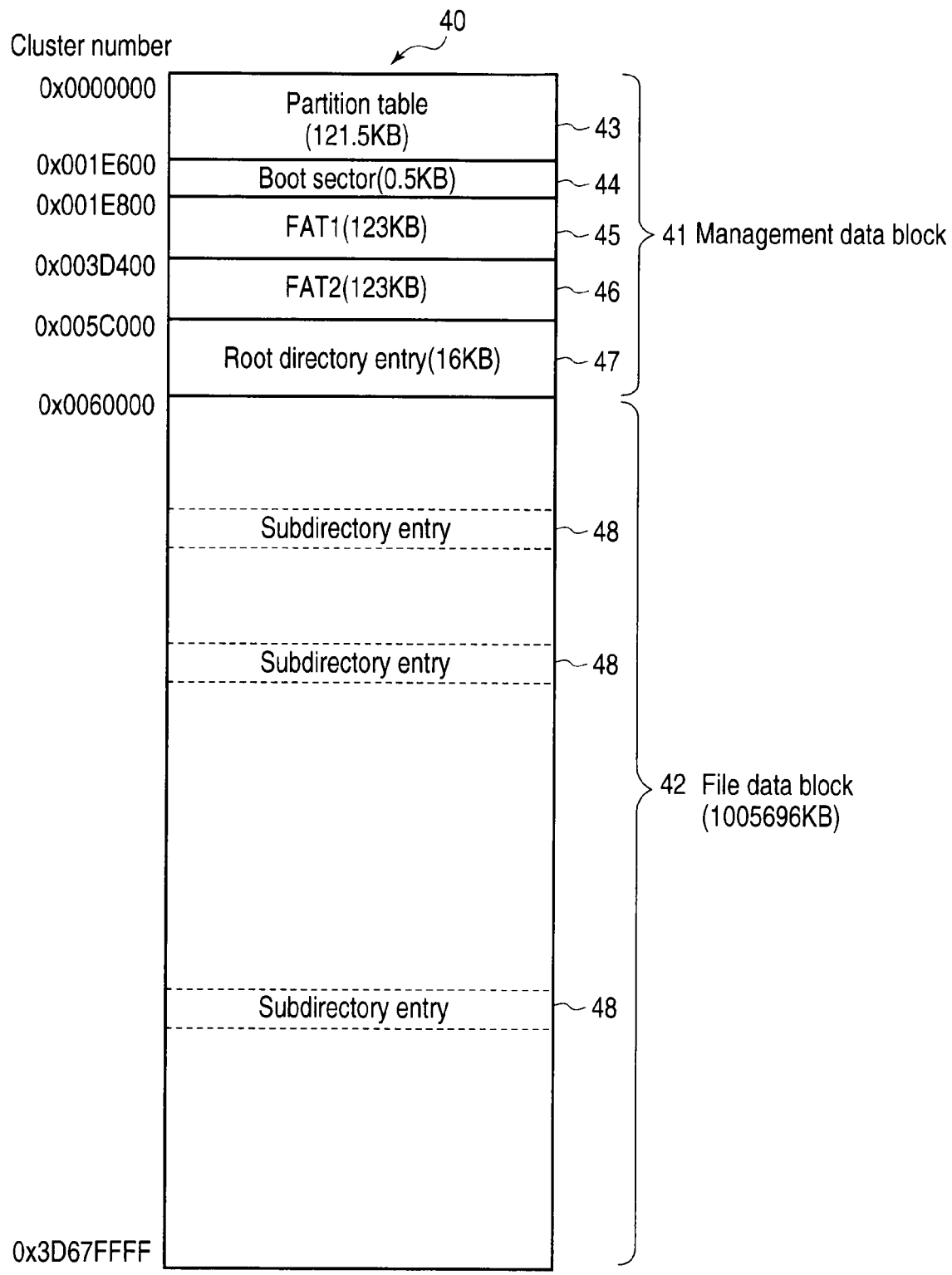
FIG. 5 is a diagram showing a memory space formatted by the FAT file system.

Prior to an explanation of format of memory 6 by a file system according to one embodiment of the invention, an outline of the FAT file system on which the file system of the embodiment is based will be described with reference to FIGS. 5 and 6. FIG. 5 shows a state of a memory space formatted by the FAT file system. Several types of management data, described below, are written. The memory space mentioned here corresponds to a memory space which the FAT file system can freely access and to user data area 24 in memory 6 in FIG. 1.

As shown in FIG. 5, the FAT file system divides a memory space of a memory into clusters of a predetermined size (for example, 16 kbytes) to manage them. A predetermined number of clusters from the lowest number cluster of memory space 40 are allocated to management data. An area which stores the management data is called a management data block 41, hereinafter. Clusters with a number higher than that for management data block 41 are allocated to file data. An area which stores the file data is called a file data block 42.

Management data block 41 is further divided into an area 43 allocated to a partition table, an area 44 allocated to a boot sector, areas 45 and 46 allocated to a FAT1 and FAT2, and an area 47 allocated to a root directory entry. The partition table stores information such as a file system type of each partition and the leading sector of the partition table. The boot sector is located at the leading sector indicated by the partition table and includes a BIOS parameter block (BPB). The BPB holds various parameters of memory 6 used by the file system. The FAT file system writes the parameters when it formats the memory and reads BPB to acquire the parameters of the file format upon booting.

The FAT1 is written in the memory and describes which cluster stores a specific part of the file data (to be simply referred to as file data hereinafter) which has the same size as the cluster, and linkage of clusters for reconstructing the file data. The FAT2 is for a backup of the FAT1 and stores the same contents as that of the FAT1.

Since it is not necessary to allocate clusters of sequence numbers to pieces of file data constituting one file, the FAT file system allocates free clusters to file data without regard to the order of cluster numbers (at random). The FAT1 and FAT2 store the linkage of clusters storing file data. Information stored in the FAT1 and the FAT2 (to be simply referred to as "FAT" hereinafter) is traced to reconstruct the original file.

The root directory entry stores a file entry of each file belonging to a root directory. The file entry includes a file name or a folder name, a file size, an attribute, update date of a file, a flag indicating which one is the leading cluster of a file, and the like. Some FAT format type (for example, FAT16 or FAT32) may put the route directory entry in any address higher than that for FAT.

When a file belongs to a subdirectory belonging to the root directory, the root directory holds cluster numbers allocated to an entry of the subdirectory (subdirectory entry) belonging to the root directory. The subdirectory entry holds a file entry of each file belonging to the subdirectory entry. As shown in FIG. 5, the subdirectory entry is written in any cluster 48 in the file data block 42 by the FAT file system. The subdirectory entry belongs to management data and is frequently updated.

Figure 6:
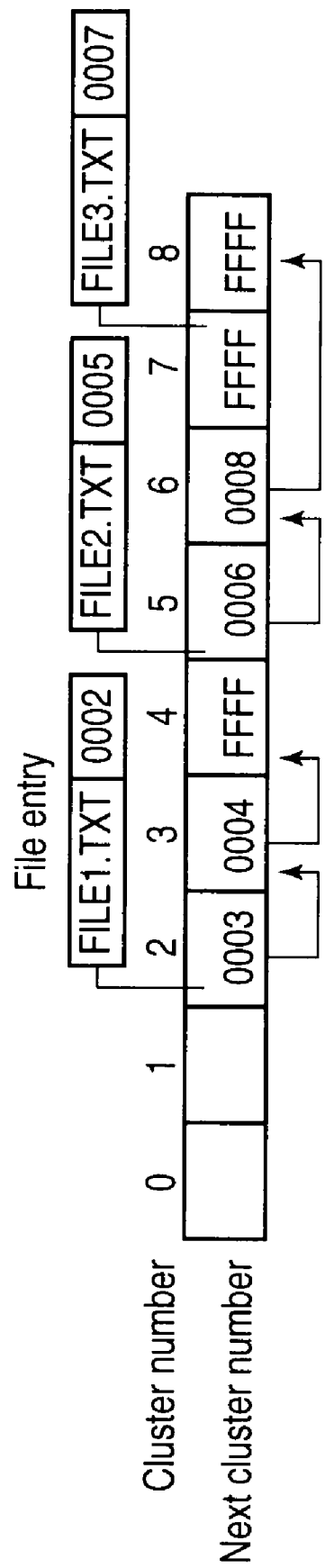
FIG. 6 is a diagram showing an example of data held by the FAT.

FIG. 6 shows an example of the FAT and the file entry. As shown in FIG. 6, the root directory entry stores location of leading clusters of files "FILE1.txt", "FILE2.txt", and "FILE3.txt" as the file entry. The leading clusters of the files "FILE1.txt", "FILE2.txt", and "FILE3.txt" are clusters 0002, 0005, and 0007, respectively.

In the FAT, a cluster number whose cluster is to be connected next to the corresponding cluster is described. For example, take "FILE1.txt" as an example. It is understood that a cluster 0003 stores data subsequent to the data in the leading cluster 0002 and cluster 0004 stores data subsequent to the data in the cluster 0003. The data in the clusters 0002, 0003, and 0004 are connected to reconstruct the file "FILE1.txt". "FFFF" is written in a cluster which holds the last part of the file data.

[1-2-3-2] FAT File System According to One Embodiment of Present Invention

A file system according to one embodiment of the invention based on the FAT file system will now be described below with reference to FIG. 7. A file system (also corresponding to file system 4 in host 1 hereinafter) formats a memory space of a storage medium as follows. Memory card 2 is formatted by file system 4.

Figure 7:
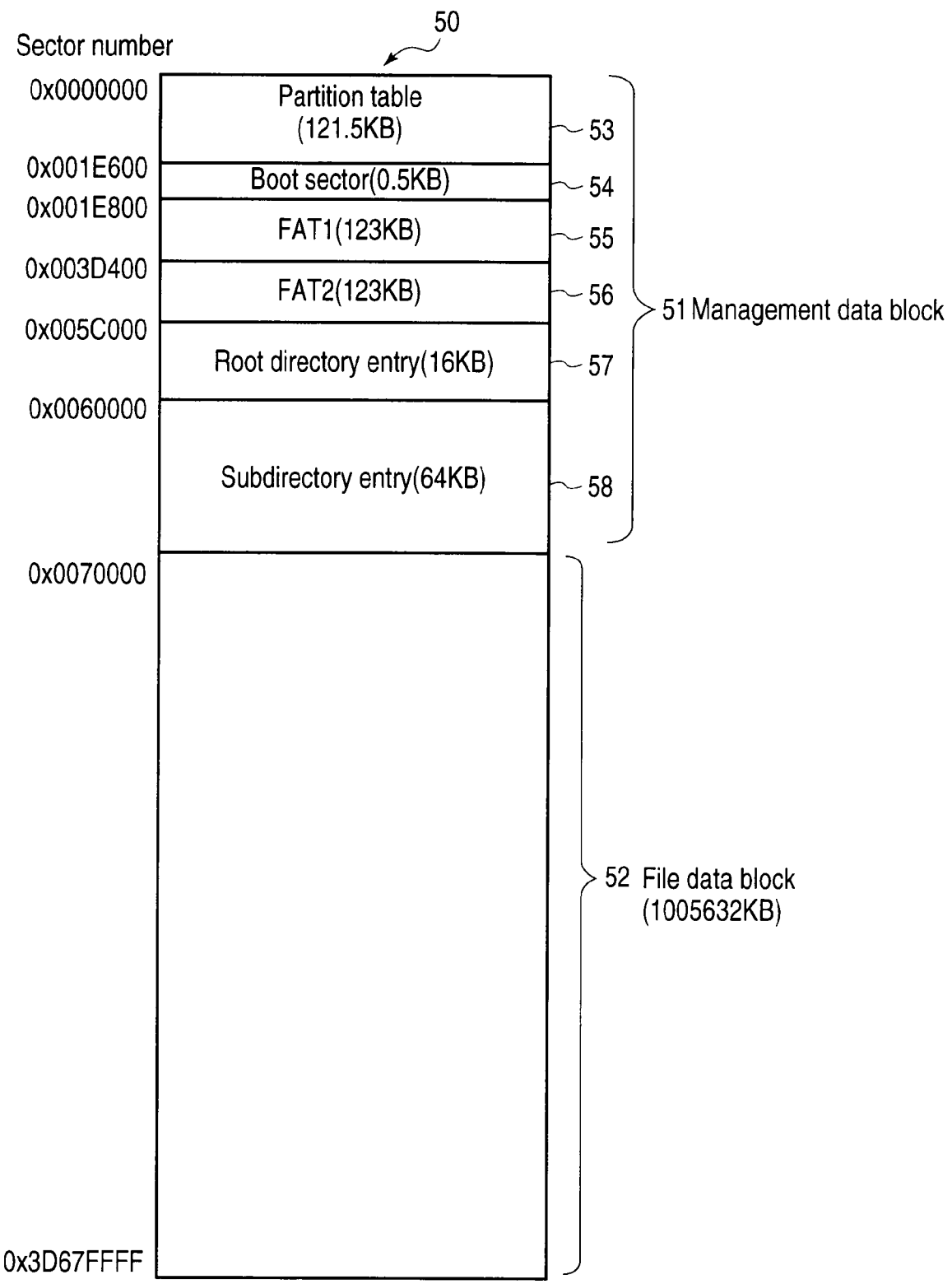
FIG. 7 is a diagram showing a memory space formatted by the FAT file system.

FIG. 7 shows a memory space formatted by file system 4 according to one embodiment of the invention. A memory space 50 shown in FIG. 7 corresponds to an area which file system 4 can use in the storage area of a storage medium to be formatted.

As shown in FIG. 7, file system 4 limits logical addresses which can be allocated to the management data used to manage file data by file system 4 to a predetermined number of logical addresses from the smallest logical address. More specifically, only logical addresses in the predetermined range can be allocated to the management data. Here, the management data includes a partition table, a boot sector, a FAT1, a FAT2, a root directory entry, and a subdirectory entry which are the same as those used in the FAT file system.

A block which stores the management data (management data block 51) includes an area 53 allocated to the partition table, an area 54 allocated to the boot sector, areas 55 and 56 allocated to the FAT1 and FAT2, an area 57 allocated to the root directory entry, and an area 58 allocated to a subdirectory entry. Data stored in the blocks 53 to 58 is the same as that defined by the conventional FAT file system.

A part of the memory space 50 except for management data block 51 is a file data block 52 dedicated to write file data. The capacity of management data block 51 is determined in accordance with a size of the memory space 50 and a size of file data block 52 required to be reserved. For example, the capacities of the partition table area 53, the boot sector area 54, the FAT1 area 55, the FAT2 area 56, the root directory entry area 57, and the subdirectory entry area 58 are 121.5 kB, 0.5 kB, 123 kB, 123 kB, 16 kB, and 64 kB, respectively. The capacity of file data block 52 is 1005632 kB.

File system 4 is based on the FAT file system (its specific type, such as FAT16, FAT32, and the like is irrelevant). Not only the FAT file system, but also a similar file system, including extended FAT, can be used. For example, it may be a file system which uses management data to manage file data and has frequently-updated management data.

[1-2-3-3] UDF File System According to Embodiment of Present Invention

A UDF file system according to one embodiment of the invention (additional-write type file system) will now be described below with reference to FIGS. 8 and 9. The file system according to the example formats a memory space of a storage medium as follows. Memory card 2 is formatted by file system 4.

Figures 8, 9:
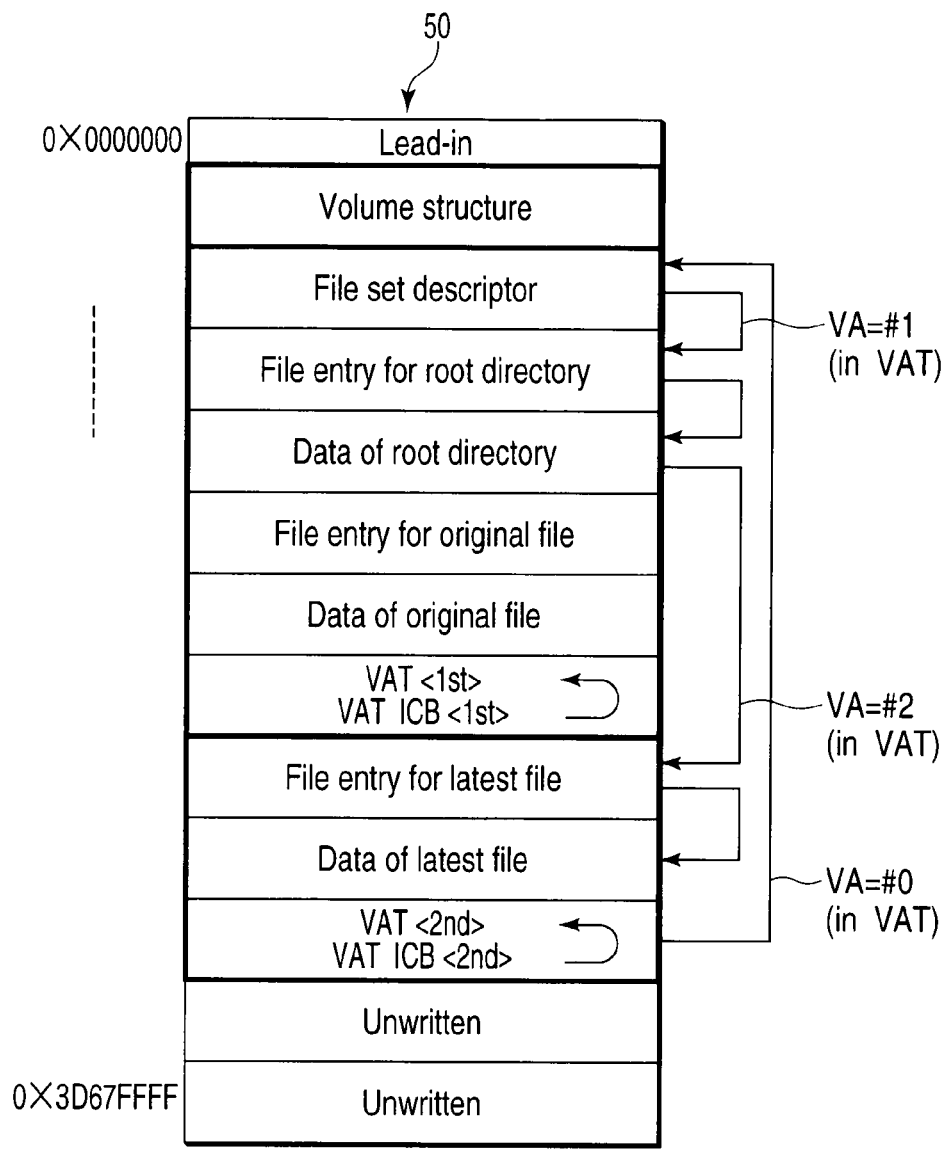
FIG. 8 is a diagram showing a memory space formatted by a UDF file system.
FIG. 9 is a diagram showing an example of a VAT.

FIG. 8 shows a file structure as the DVD-R file system recognizes when it is applied to the memory card. As shown, memory space 50 corresponds to an area which file system 4 can use in the storage area of a storage medium to be formatted, and it is formatted only by an additional-write type file system (UDF file system, in the example). In other words, memory space 50 is formatted only by the UDF additional-write type file system, which is a pure additional-write type file system.

When controller 7 is instructed to write data in an address which is equal to or smaller than the address of written data in an address area of memory space 50 shown in FIG. 8, it transmits a write protect error to host 1 (to outside). That is, data to which a logical address belonging to file data block 50 shown in FIG. 8 is prohibited to be overwritten and is only allowed to be written in an additional-write manner. Controller 7 accepts a write request only when a logical address higher than the allocated logical address is allocated in the write request. When controller 7 receives a write request which does not satisfy the condition, it does not perform write and transmits a status indicative of a write protect error to host 1. FIG. 8 shows file data block 50 after a file is updated, deleted and added.

As shown in FIG. 8, a volume structure, a file set descriptor, a file entry for the root directory, and data of the root directory are arranged in the mentioned order from the sector number (0x0000000) to the bottom. These are followed by a file entry for the first written file (original file), that is, the file before the addition and deletion. Data of the original file succeeds the file entry, followed by VAT generated during the first write (VAT<1st>) and ICB of this VAT.

Then, a file entry for the updated file and an updated file are located, followed by the VAT generated during the update (VAT<2nd>) and an ICB of this VAT. The following VAT<2nd> and the ICB are a series of unwritten areas.

FIG. 9 shows an example of VAT<2nd>. As shown in FIG. 9, virtual addresses are associated with logical addresses.

To read data of a file, the file system reads the latest VAT ICB. The VAT ICB is always located at the tail of the written areas. In the example shown in FIG. 8, VAT ICB<2nd> is accessed.

With reference to the position of the latest VAT described in VAT ICB<2nd>, the file system reads the VAT. Then, the file system accesses the file set descriptor. To do this, the logical address of the file set descriptor is determined from virtual address #0 using the VAT.

Then, the file system reads the file entry for the root directory from the address described in the file set descriptor. Actually, the file system reads the ICB and then accesses the address of the file entry described in the ICB.

Then, the file system uses virtual address #1 described in the file entry for the root directory and the VAT to access the data of the root directory. Then, the file system accesses the ICB of the latest file using the virtual address described in the data of the root directory. The file system then uses virtual address #2 described in this ICB and the VAT to access the file entry for the latest file. Then, the file system reads the data of the latest file from the address described in the file entry.

[1-2-4] Relationship Between Management Data Block, File Data Block, and Write Type A relationship between management data block 51, file data block 52, and a write type will now be described with reference to FIG. 10.

Figure 10:
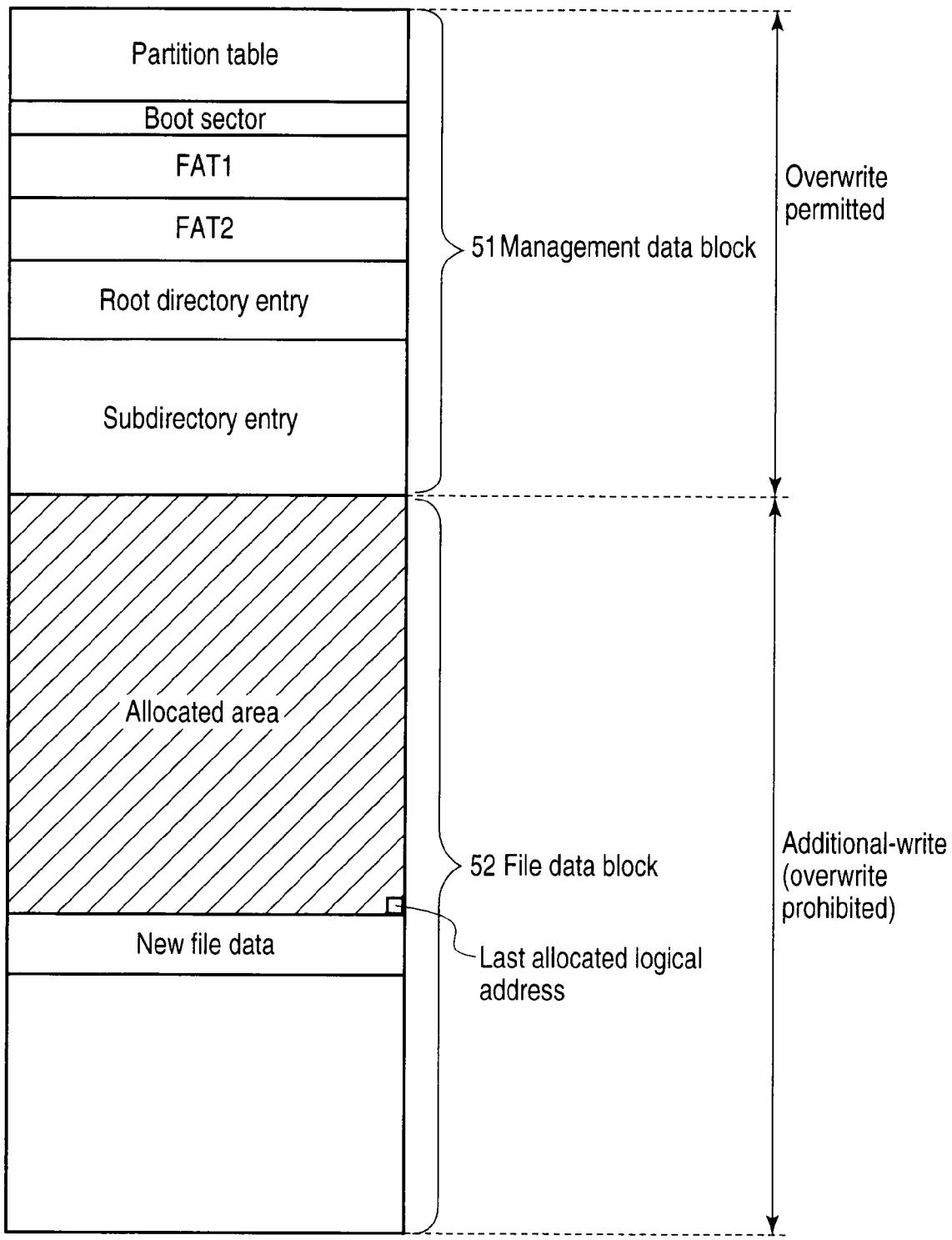
FIG. 10 is a diagram showing a correspondence between management data blocks, file data blocks and a write type.

FIG. 10 is a diagram showing a correspondence between a management data block 51, a file data block 52, and a write type. As shown in FIG. 10, when controller 7 receives an update request to a logical address belonging to management data block 51, overwrite is performed. Here, the "overwrite" is a write type which can allocate a logical address to which data has already been allocated to another piece of data. Hereinafter, the logical address belonging to management data block 51 is referred to as an overwrite-type logical address. Since memory 6 is a NAND flash memory, overwrite on written data is prohibited. For this reason, it is possible to use a component called a cache physical block (cache block), as required. The cache physical block will be described later.

Data to which an overwrite-type logical address is allocated is management data, and is frequently updated. Accordingly, in order to quickly write data for frequent update, a block dedicated to additional-write, which is called a cache block, may be provided in memory 6. The cache block is provided in addition to physical blocks (original blocks) in which data of each logical address is essentially written.

Pieces of data of a predetermined set of logical addresses are written in the same original block. Each time a request for updating written data is received, the data is sequentially written in free pages in the cache block from a lower physical address to a higher physical address. During this process, memory card 2 forms a correspondence table showing a specific page of the cache block on which the latest data of certain logical address is written. The result is achievement of high-speed write without data copy even if an update is requested to a certain logical address. When the cache block is used, i.e., in order to manage overwrite-type logical addresses, a correspondence of a logical address of a sector to a physical address of a page is managed.

For the small capacity file data, overwrite-type logical addresses can be allocated to such file data.

On the other hand, data to which logical addresses belonging to file data block 50 shown in FIG. 8 are allocated is prohibited to be overwritten and is only allowed to be written in additional-write manner. The "additional write" refers to a scheme which allocates a logical address higher than that to which data has been allocated to write-data. Controller 7 accepts a write request only when a logical address higher than the allocated logical address is allocated in the write request. When controller 7 receives a write request which does not satisfy this condition, it does not perform write and transmits a status indicative of a write protect error to host 1. The logical address belonging to file data block 52 will be referred to as an additional-write type logical address hereinafter.

With respect to data to which additional-write type logical addresses are allocated, one physical block is allocated to a set (to be referred to as a logical block) of a predetermined number of logical addresses, for example. Accordingly, with respect to additional-write type logical addresses, a correspondence of an address (allocated to each logical block) of a logical block to an address of a physical block is managed. A logical block has the same size as that of, for example, a physical block.

When file data is to be updated, file system 4 requests memory card 2 to write file data to which a logical address higher than an allocated logical address is allocated and update management data.

Information indicative of a range of overwrite-type logical addresses, for example, the highest overwrite-type logical address is written in system data area 21. The information of the highest overwrite-type logical address is written when memory card 2 is formatted. The lowest additional-write type logical address may be used to indicate the boundary between an overwrite-type logical address and an additional-write type logical address.

[1-2-5] Correspondence of Write Type to Write Mode

A correspondence of a write type to a write mode will now be described with reference to FIG. 11. FIG. 11 shows a correspondence of a write type to a write mode in a controller according to one embodiment of the invention.

As shown in FIG. 11, controller 7 can write data to which an overwrite type logical address is allocated in memory 6 in the two-level mode and write data to which an additional-write type logical address is allocated in memory 6 in the multi-level mode. Therefore, management data, which is of a small size and is required to be frequently updated, is written in the two-level mode, which can store data of a small size, perform high-speed write, and has high resistance to frequent overwrites. On the other hand, file data which is of a large size can be written in the multi-level mode, which can store a large capacity and perform low-speed write. Selecting a write mode in accordance with data characteristics can write data in memory card 2 at high speed and provide a large storage capacity. More generally, one memory cell stores m-bit (m being an integer of 1 or more) data for management data and one memory cell stores n-bit (n being an integer given by n>m) data for file data.

Physical blocks may be classified into those for the two-level mode write and those for the multi-level mode write. More specifically, controller 7 may use physical blocks included in a range from, for example, the lowest physical address to a predetermined boundary for write in the two-level mode, and may use those included in a range from the boundary to the highest physical address for write in the multi-level mode.

In the multi-level mode write, a physical block for the two-level mode can also be used as buffer 32. As described above, controller 7 writes control data in user data area 24. Controller 7 also writes the control data in the physical block in the two-level mode and may overwrite it.

As described above, protected data area 23 and user data area 24 are logically formatted as separate volumes by host 1. Since protected data area 23 generally has a small capacity and stores file data subjected to frequent updates, controller 7 writes data in protected data area 23 in the two-level mode and may also overwrite data therein. Similarly, in system data area 21 and confidential data area 22, data is written in the two-level mode, and overwrite is permitted.

As described above, protected data area 23 and user data area 24 may not belong to separate volumes but may belong to different partitions. In this case, each partition can independently employ a conventional file system which allows for overwrite of all kinds of data or the file system according to the embodiment of the invention which allows for overwrite of only management data.

[1-3] Configuration of SD Interface

A configuration of the SD interface will now be described with reference to FIGS. 12 to 18.

[1-3-1] Method for Transmitting and Receiving Last Allocated Logical Address

Figure 12:
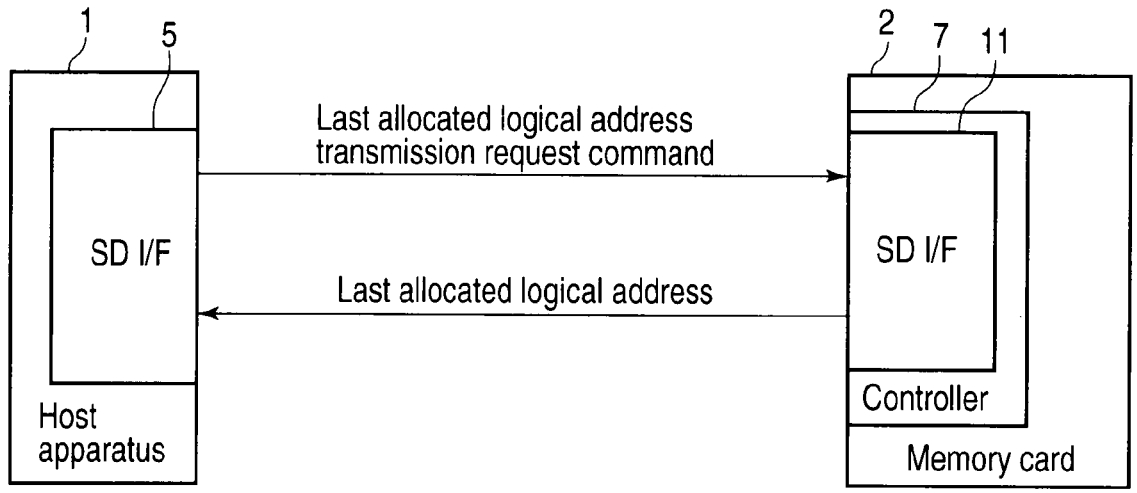
FIG. 12 is a diagram showing a configuration to transmit and receive a last allocated logical address.
Figure 13:
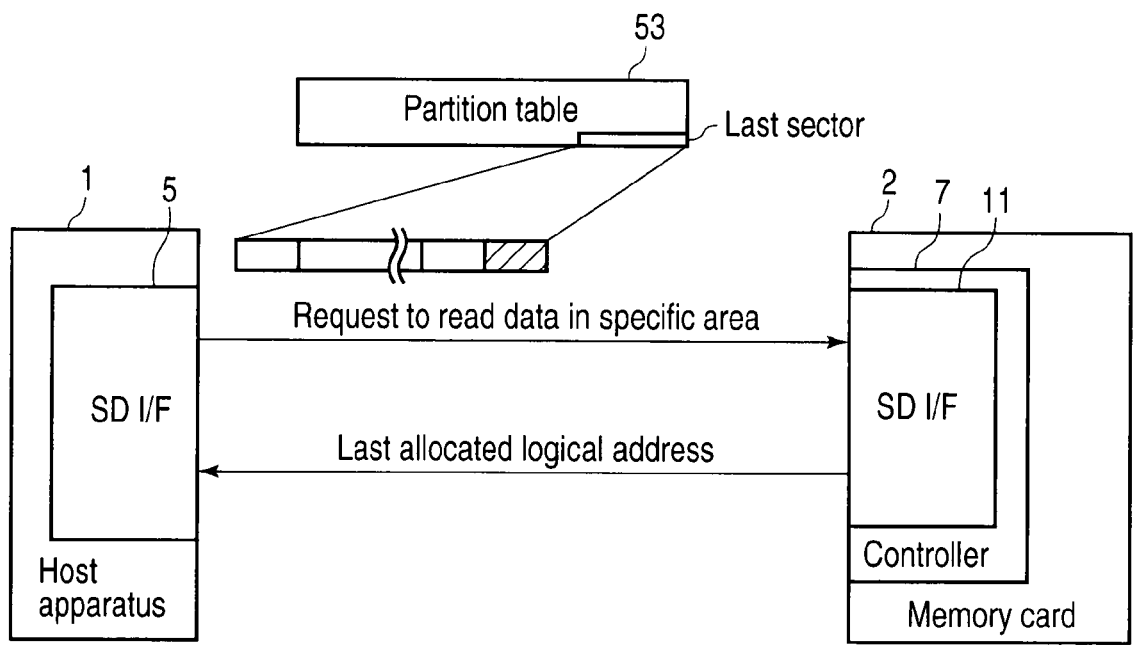
FIG. 13 is a diagram showing a configuration to transmit and receive the last allocated logical address.

Host 1 (file system 4) must acquire a logical address which is last allocated (last allocated logical address) in order to write file data by the additional-write type scheme. To do this, a command to transmit and receive the last allocated logical address is provided in SD interfaces 5 and 11. FIGS. 12 and 13 are diagrams showing a configuration to transmit and receive the last allocated logical address.

Controller 7, upon write, writes the last allocated logical address on RAM 14, as will be described later.

As shown in FIG. 12, host 1 issues a command which requests to transmit the last allocated logical address to controller 7. Upon receipt of the command, controller 7 transmits the last allocated logical address stored on RAM 14 to host 1 as a response. Host 1 acquires the last allocated logical address from the response. Host 1 starts allocation at the logical address subsequent to the last allocated logical address, and performs an additional-write type write to memory card 2.

In place of a dedicated command, the following method can be used. As shown in FIG. 13, upon receipt of a request for reading a specific logical address, controller 7 transmits the last allocated logical address to host 1 as read data. An example of such a specific logical address is the last 8 bytes in the last sector of partition table block 53. This method enables memory card 2 used with a universal serial bus (USB) reader/writer (RW) having conventional specifications which do not support a new command to transmit the last allocated logical address through software on a PC into which the USB RW is inserted.

[1-3-2] Method for Authentication of Permission of Data Write

If a conventional file system is used to write data in memory card 2 according to one embodiment of the invention, an inconsistency occurs in management data. The result may be destruction of the file contents. For avoiding such inconvenience, a command for authentication of write to memory card 2 is provided in SD interfaces 5 and 11. FIGS. 14 and 15 are diagrams showing a configuration for authentication of permission to write data.

As shown in FIG. 14, controller 7 waits for a data write permission request command from host 1 after initialization. When controller 7 receives the command, the reception means that host 1 supports the command, i.e. it contains file system 4 according to one embodiment of the invention, memory card 2 then accepts the write request.

When controller 7 does not receive the data write permission request command, it always returns a write protect error signal in response to the write request from host 1. According to such technique, the data of memory card 2 is prevented from being destroyed by a file system other than file system 4 according to one embodiment of the invention.

In place of providing a dedicated command, the following method can be used. As shown in FIG. 15, once controller 7 receives a request for writing specific data to a specific logical address, memory card 2 accepts subsequent write requests from the host. An example of such a specific logical address is the first 8 bytes in the last sector of partition table block 53. An example of the specific data may be at least one of 0x01, 0x23, 0x45, 0x67, 0x89, 0xAB, 0xCD, and 0xEF. This method enables memory card 2 used with a USB RW having conventional specifications which do not support a new command to transmit the last allocated logical address through software on a PC into which the USB RW is inserted.

[1-3-3] Method of Acquiring Range of Overwrite Type Logical Address by Host

The host (file system 4) must acquire the boundary between the overwrite type logical address and the additional-write type logical address. To do this, a command to transmit and receive the highest overwrite type logical address is provided in SD interfaces 5 and 11. FIGS. 16 and 17 are diagrams showing a configuration for a host to acquire the highest overwrite type logical address. As a method of acquiring the boundary between the overwrite type logical address and the additional-write type logical address, a lowest additional-write type logical address may be also used in place of the highest overwrite type logical address to perform the following process.

As shown in FIG. 16, host 1 issues a command to request to transmit the highest overwrite type logical address to controller 7. Upon receipt of the command, controller 7 transmits the highest logical overwrite type logical address stored in system data area 21 to host 1 as the response.

Host 1 can use the command to acquire the range of overwrite type logical addresses. File system 10 of host 1 refers to the highest overwrite type logical address to construct a new file or a new directory entry at lower logical addresses than the highest overwrite type logical address, i.e., overwrite type logical addresses.

In place of providing a dedicated command, the following method can be used. As shown in FIG. 17, upon receipt of a request to read a specific logical address, controller 7 transmits the highest overwrite type logical address to host 1 as the read data. An example of such a specific logical address is the second 8 bytes from the last in the last sector of partition table block 53. This method enables memory card 2 used with a USB RW having conventional specifications which do not support a new command to transmit the last allocated logical address through software on a PC into which the USB RW is inserted.

[1-3-4] Card Type Flag

Figure 18:
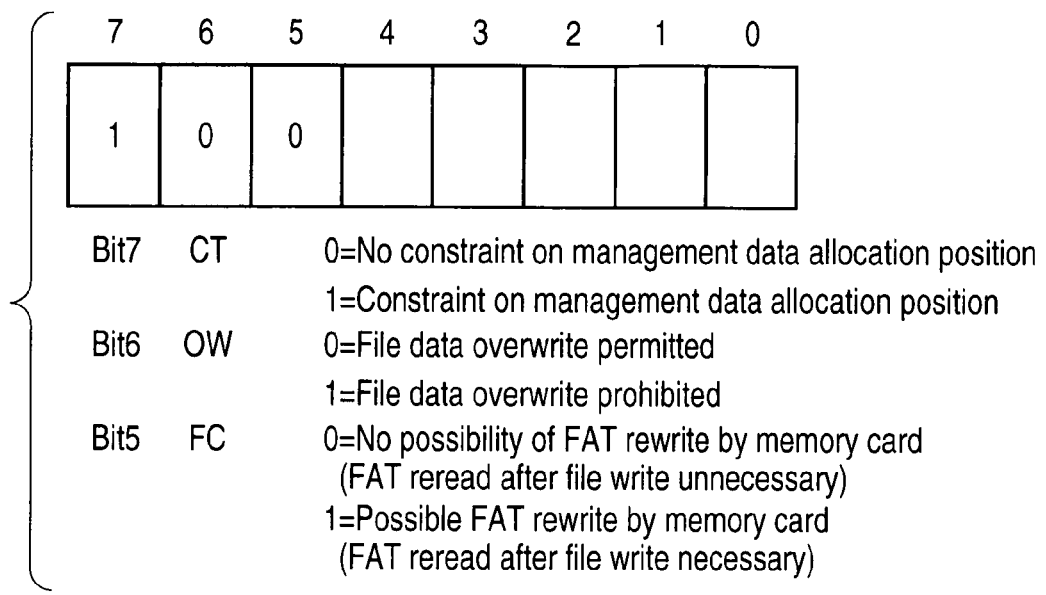
FIG. 18 is a diagram showing an example of register CSD in detail.

A flag indicative of a type of memory card 2 and a write type depending on the type is described in register CSD of register 15. FIG. 18 shows an example of register CSD in detail.

As shown in FIG. 18, three areas are defined in addition to conventionally defined areas in register CSD (by using undefined area). FIG. 18 illustrates that 0th to fourth bits are already defined and newly defined bits CT, OW, and FC are set as fifth, sixth, and seventh bits, respectively.

Bit CT (register CT) represents a constraint of allocation of logical addresses to management data. For example, "0" represents that any logical address can be allocated to management data (especially, a directory entry) in writing to memory card 2. On the other hand, for example, "1" represents that logical addresses in a predetermined range must be allocated to management data, as in one embodiment of the invention.

Bit OW (register OW) represents an overwrite constraint of file data. For example, "0" represents that overwrite of file data is not prohibited. On the other hand, for example, "1" represents that overwrite is prohibited on some logical addresses, as in one embodiment of the invention.

Bit FC (register FC) represents a possibility of rewrite of the FAT by memory card 2. Some controller may rewrite the FAT after it writes file data, according to operational characteristics. In this case, the file system of the host needs to read the FAT after write of file data. To do this, the bit FC is set to allow the file system to know whether it needs to read the FAT or not. For example, "0" represents that memory card 2 does not rewrite the FAT (the file system does not need to reread the FAT). On the other hand, for example, "1" represents that memory card 2 may rewrite the FAT (the file system needs to reread the FAT).

In memory card 2 according to one embodiment of the invention, CT=1, OW=1, and FC=0.

Defining theses bits allows the file system to easily acquire the characteristics of memory card 2.

[2] Operation

Operations of host 1 and memory card 2 will now be described with reference to FIGS. 19 to 23.

[2-1] Initialization of Memory Card

Figure 19:
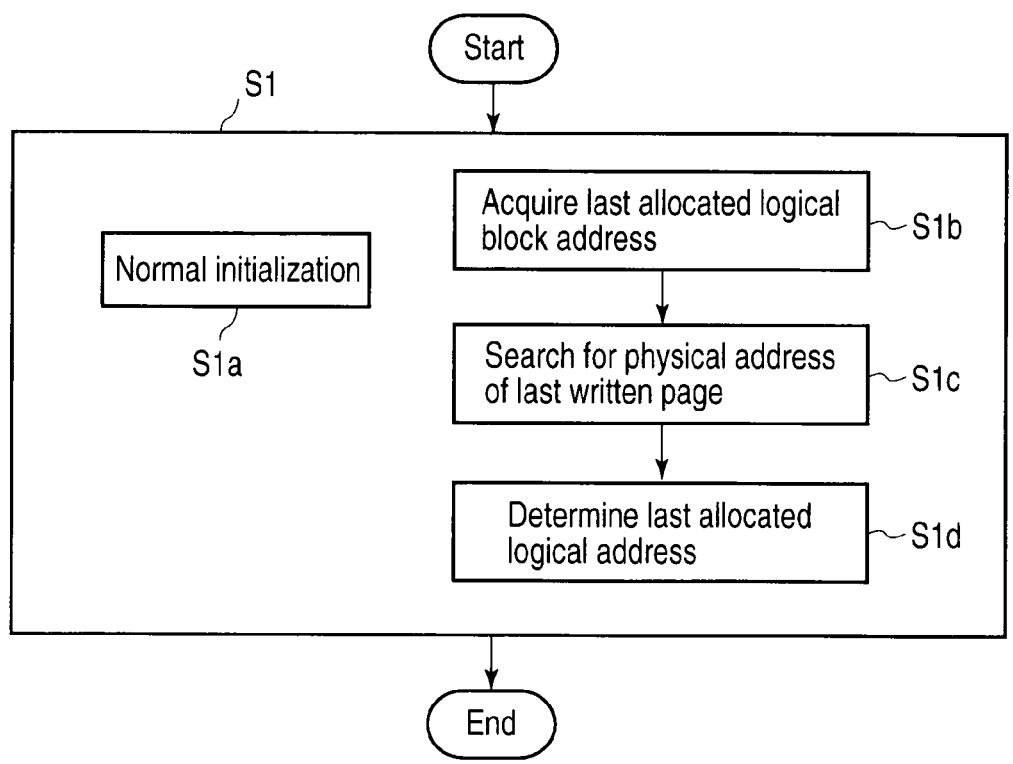
FIG. 19 is a flow chart for initialization of a memory card.

An initialization for memory card 2 will now be described with reference to FIG. 19. FIG. 19 is a flow chart for initialization of the memory card according to one embodiment of the invention.

Controller 7 writes several pieces of information in memory 6 in order to acquire the highest additional-write type logical address which is allocated to data in the initialization. For example, when file data to which an additional-write type logical address is allocated is written, controller 7 writes not only file data but also a flag representing that the data is written in a redundant area of each page. An address of a logical block including the logical address which is last allocated is stored in system data area 21.

As shown in FIG. 19, upon receipt of an initialization command after the start of power supply, controller 7 starts an initialization. Initialization S1 is constituted by the initialization for a conventional memory card (step S1a), and determination of the last allocated additional-write type logical address and write of the determined logical address on RAM 14.

Since, for additional-write type logical addresses, only the correspondence between a logical block and a physical block needs to be managed, one logical address which is last allocated can be determined by the following method. First, in step S1b, controller 7 acquires an address of a logical block including the last allocated logical address (last allocated logical block address) from system data area 21.

In step S1c, controller 7 checks a redundant area of each page in a physical block to which the last allocated logical block is allocated (last written physical block) to acquire the physical address of the last written page. With the information, controller 7 acquires the number of written pages in the last written physical block. In step S1d, controller 7 calculates the last allocated logical address from ((the number of all logical blocks of lower addresses than the last written logical block address)×(the number of logical addresses per logical block)+the number of written pages in the last written physical block)). In step S5, the last allocated logical address (last allocated logical address) is written on RAM 14.

[2-2] Write

Figure 20:
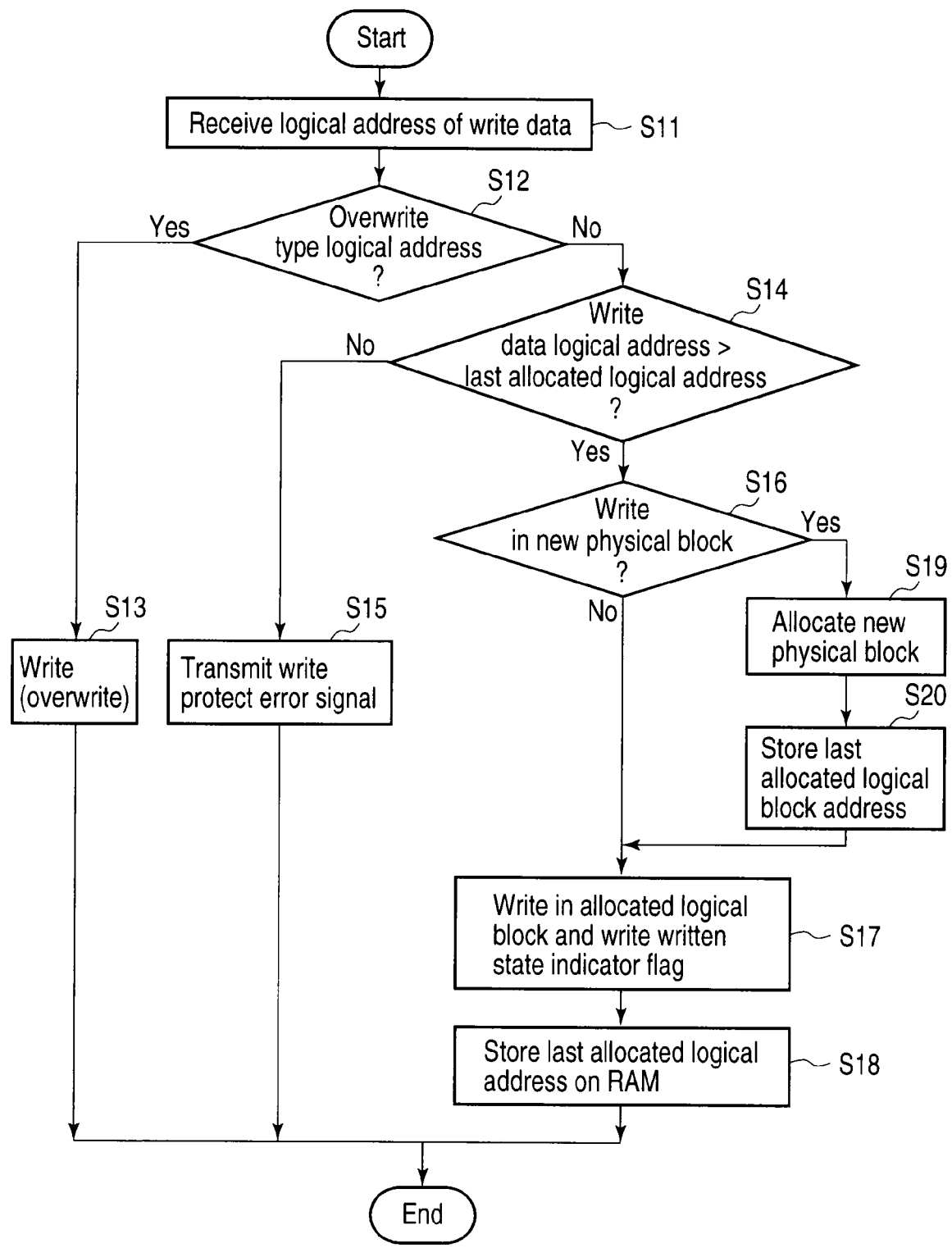
FIG. 20 is a flow chart for write in the memory card.

Write in memory card 2 will now be described with reference to FIG. 20. FIG. 20 shows a flow chart for write in a memory card according to one embodiment of the invention.

As shown in FIG. 20, in step S11, controller 7 receives a write command and write data to which a logical address is allocated.

In step S12, controller 7 determines whether a logical address which is allocated to the write data is an overwrite type logical address. When an overwrite type logical address is allocated to the data, the process shifts to step S13. In step S13, controller 7 writes data in memory 6. The data to be written in step S13 is management data, and it is expected to be frequently overwritten. Therefore, controller 7 may use the cache block described in section [1-2-4] to perform write.

On the other hand, when step S12 determines that an additional-write type logical address is allocated to the write data, the process shifts to step S14. In step S14, controller 7 refers to RAM 14 to determine whether the logical address of the write data is higher than the last allocated logical address or not.

When step S14 determines that the logical address of the write data is not higher than the last allocated logical address, i.e., when overwrite is requested, the process shifts to step S15. In step S15, controller 7 transmits a write protect error to host 1, refuses to write data, and then ends the write.

On the other hand, step S14 determines that the logical address of the write data is higher than the last allocated logical address, the process shifts to step S16. The write data may be required to be written on a page in a physical block other than a physical block including the last written page. In step S16, it is determined whether the write data should be written on a page in the physical block including the last written page or another physical block.

Figure 21:
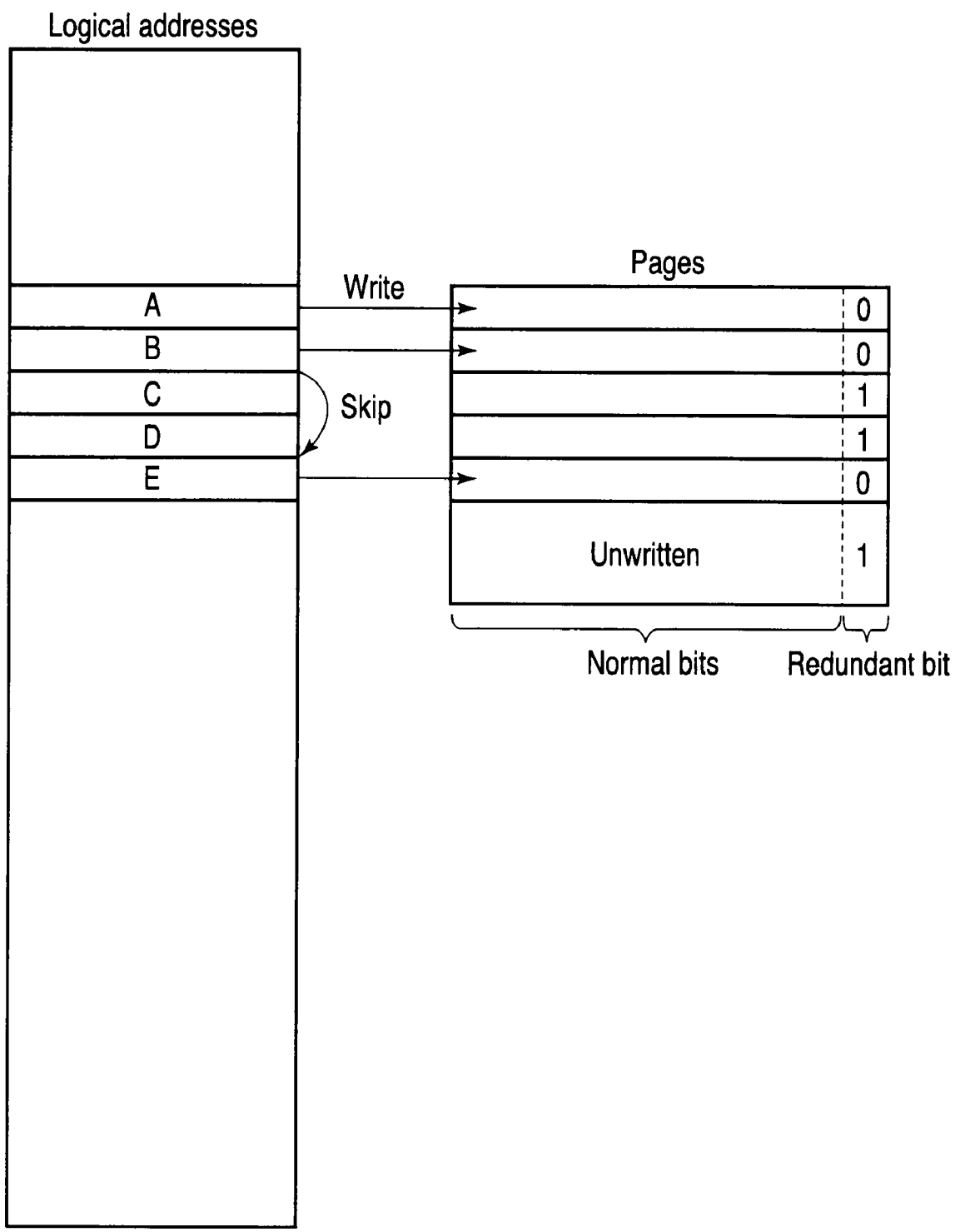
FIG. 21 is a diagram showing a result of a write on the memory card.

When the data is to be written on the page in the physical block including the last written page, the process shifts to step S17. In step S17, controller 7 writes the write data on a page in an allocated physical block. During the write, controller 7 writes a flag (for example, "0") representing that data has been written at a bit in a redundant area of the page on which data is being written as shown in FIG. 21. Since the write data to be written here is file data, controller 7 can write the write data in the multi-level mode.

In step S18, controller 7 writes the last allocated logical address on RAM 14.

On the other hand, when step S16 determines that the data is to be written on a page in the physical block other than the physical block including the last allocated page, the process shifts to step S19. In step S19, a physical block in which the write data is to be written is prepared. When no erased physical block is available, controller 7 erases a physical block which stores no effective data, and the write data will be written in the erased physical block.

In step S20, controller 7 sets an address of the logical address corresponding to the physical block which now stores the write data as the last allocated logical block address. The last allocated logical block address is written in memory 6 as a part of control data for controller 7. The process then shifts to step S17.

Figure 22:
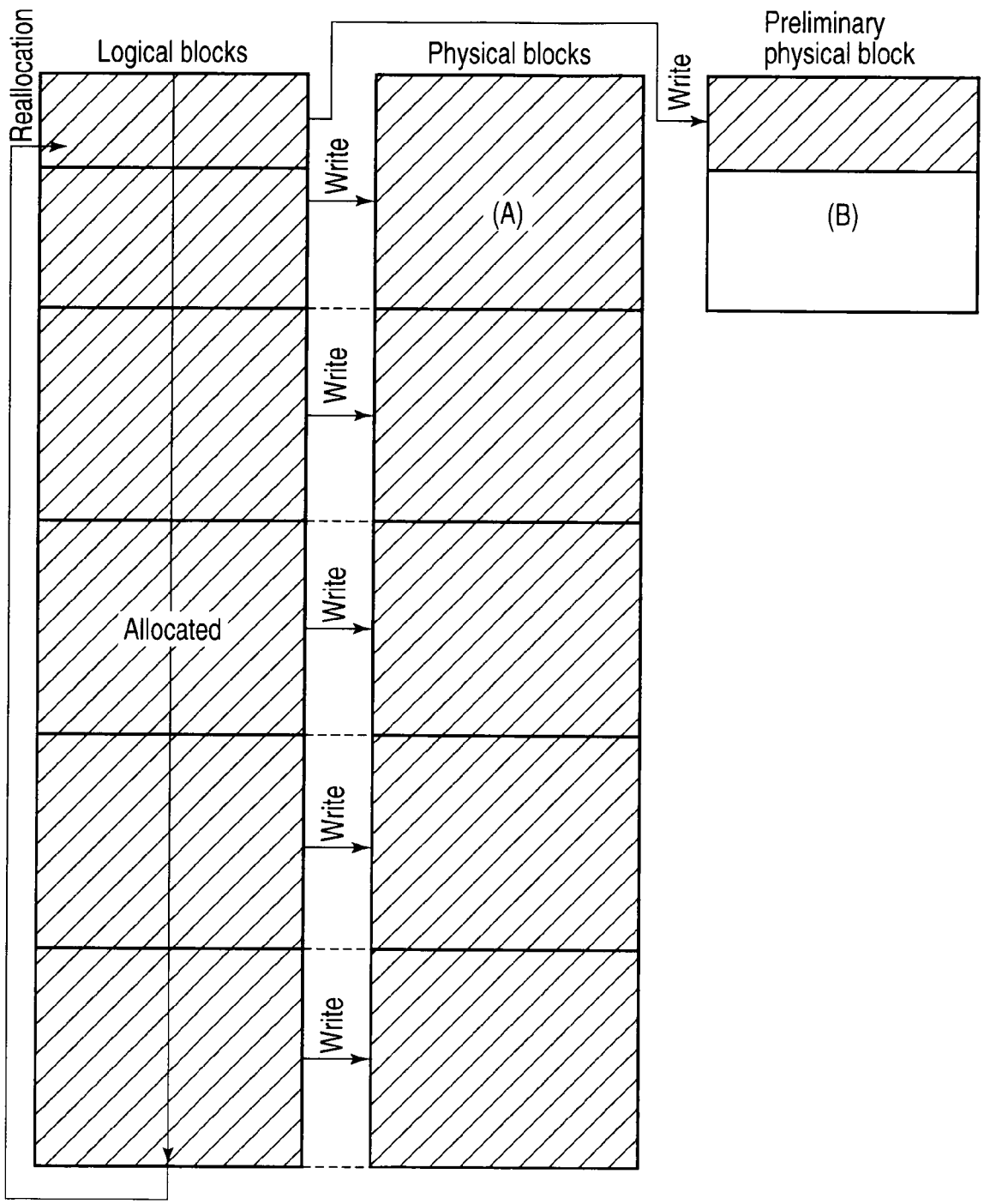
FIG. 22 is a diagram showing a state of the write on the memory card.

When the last allocated logical address coincides with the highest additional-write type logical address, controller 7 replaces the last allocated logical address with an address lower than the lowest additional-write type logical address by one. More specifically, a virtual state in which no additional-write type logical address is allocated to data is created. As a result, controller 7 can maintain an additional-write type write. However, since memory 6 stores data to which a series of additional-write type logical addresses from the lowest one are allocated in physical block (A), controller 7 writes the write data in a preliminary physical block (B) which is in general provided as shown in FIG. 22. Thus, two physical blocks, (A) and (B), are associated with the logical block in which the latest data is being written. After data write in the physical block (B) is completed and further write to a physical block occurs, the preliminary physical block (B) serves as an original normal physical block, and the physical block (A) serves as a preliminary block.

As described above, file system 4 uses the additional-write type scheme to allocate logical addresses to file data. For this reason, logical addresses of the write data are serial numbers in general. However, some logical addresses may be skipped. As FIG. 21 illustrates, in serial logical addresses A to E, data to which logical addresses A and B are allocated are written, and then, data to which logical address E is allocated may be requested to be written. In this case, even though data to which logical addresses C and D are allocated exist, memory card 2 does not assure the contents of the data of such addresses. However, since the logical addresses of the file data are serial numbers in general as described above, failure of assurance of such data is not significant. Rather, since attempt to assure data of skipped logical addresses forces memory card 2 to copy data, this constraint can effectively avoid a decrease in write speed by memory card 2 without serious problems.

[2-3-1] Allocation by File System 4 (1)

Figure 23:
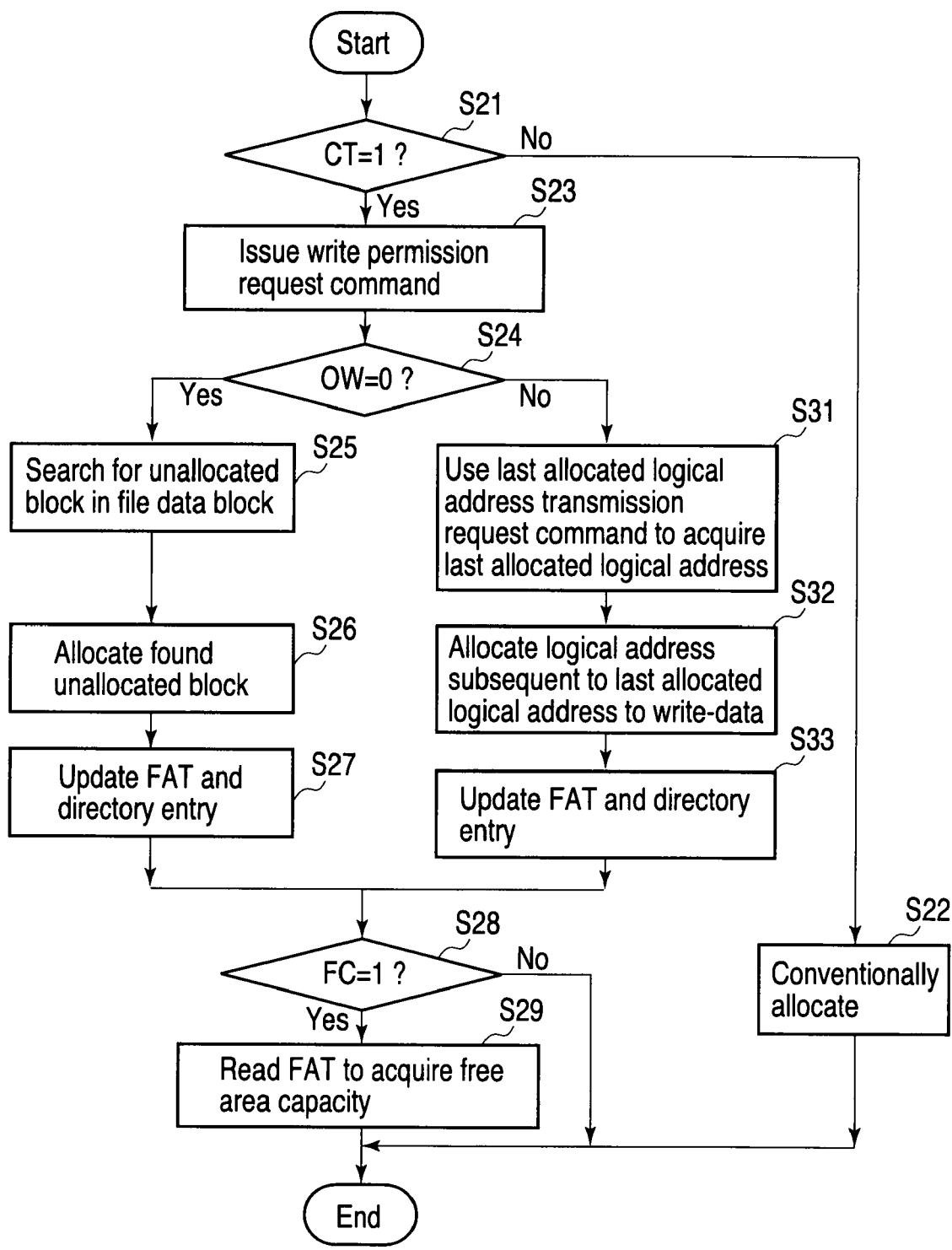
FIG. 23 is a flow chart of an allocation by an overwrite type file system.

Allocation of a logical address to write data by file system 4 will now be described with reference to FIG. 23. FIG. 23 shows a flow chart for allocation by a file system according to one embodiment of the invention.

File system 4 refers to register CT to determine a type of memory card 2 in step S21 before it allocates a logical address to write-data. When any logical address can be allocated to the management data in memory card 2, i.e., when register CT1 holds "0", the process shifts to step S22. In step S22, file system 4 uses the same method as that of the conventional FAT file system to allocate a logical address to the write data.

On the other hand, when step S21 determines that only a limited logical address can be allocated to the management data, the process shifts to step S23.

In step S23, file system 4 issues a data-write authentication command to memory card 2 to enable write.

In step S24, file system 4 refers to register CT to determine whether file data can be overwritten or not. When overwrite is permitted, i.e., when register OW holds "0", the process shifts to step S25.

In step S25, file system 4 searches for an unallocated logical address. During the process, the order of logical addresses allocated to the write data, the seriality of the logical addresses, and the like are of no importance. In step S26, file system 4 allocates the found unallocated logical address to the write data. In step S27, file system 4 updates the FAT and the directory entry to reflect the allocation in step S26. The process then shifts to step S28.

On the other hand, when step S24 determines that overwrite is prohibited, the process shifts to step S31. In step S31, file system 4 issues a last allocated logical address transmission request command to memory card 2 to acquire the last allocated logical address. In step S32, file system 4 allocates a logical address subsequent to the last allocated logical address to the write data. In step S33, file system 4 updates the FAT and the directory entry to reflect the allocation in step S32. The process shifts to step S28.

In step S28, file system 4 refers to register FC to determine whether memory card 2 may rewrite the FAT or not. When memory card 2 does not write the FAT, the process ends. On the other hand, when memory card 2 may rewrite the FAT, file system 4 reads the content of the FAT from memory card 2 to reflect the content of the FAT which file system 4 recognizes. The process then ends.

[2-3-2] Allocation by File System 4 (2)

Allocation of a logical address to write data by file system 4 will now be described with reference to FIG. 24. FIG. 24 shows a flow chart for allocation by an additional-write type UDF file system according to one embodiment of the invention. In the following, description on steps which are substantially identical to steps S21 to S25 in section [2-3-1] will be omitted.

The software refers to the flag for the card type to perform file write in accordance with the card type. More specifically, when step S24 determines that overwrite is allowed, i.e., register OW holds "1", the process shifts to step S41.

Note that when the host which uses the software to perform file write detects CT=1 in step S21 during initialization of the card, it issues the dedicated data-write authentication command to set the memory card writable.

In step S41, file system 4 uses "last written address acquire command" to acquire the last written address form the card.

In step S42, file system 4 reads the VAT ICB in the address which immediately precedes the last written address.

In step S43, file system 4 uses the VAT ICB to read the latest file management information.

In step S44, file system 4 additionally writes a file in the UDF scheme. More specifically, it additionally writes a sequence of data one after another in a memory space which is formatted only for UDF, which is of the additional-write type, to update the file.

In step S45, file system 4 additionally writes the VAT ICB. The process then shifts to S28 and ends.

Since the above process of illustrative step S41 to S45 does not require overwrite of data of the FAT area or the directory entry, the overwrite area does not need to be used. For this reason, when only the additional-write UDF is used as in the present example, or, for example, when file system 4 is applied to a memory card which has a memory space which is constituted by address areas where all the entire user data area is formatted by the additional-write type without any overwrite area, more advantages are obtained.

Note that the present example describes a file write. The description can, however, be applied to file read, which also brings similar advantages. For application as to a file read, file read software of the UDF type is required.

[2-4] Read

Data read will now be described. The read is the same as that in a conventional memory card. More specifically, host 1 supplies a read command to memory card 2 without considering whether or not the memory card is memory card 2 according to one embodiment of the invention. Controller 7 uses a logical-physical conversion table to convert a logical address of the read data into a physical address. Memory card 2 reads data from the page (physical block) of the determined physical block in memory card 2 and outputs it to host 1.

As described in section [2-2], when physical blocks (A) and (B) are allocated to one logical address, read data is read from the two physical blocks as needed.

[3] Additional Configuration

A configuration which can be additionally used in the configuration described above will now be described with reference to FIGS. 25 to 27.

[3-1] Initialization Command to Data to which Additional-Write Type Address is Allocated A command to initialize (erase) all physical blocks which store data to which additional-write type logical addresses are allocated (additional-write type logical address data storage physical blocks) is provided in SD interfaces 5 and 11. FIG. 25 shows a flow chart for processes of controller 7 when it receives the command to initialize the additional-write type logical address data storage physical block.

Figure 25:
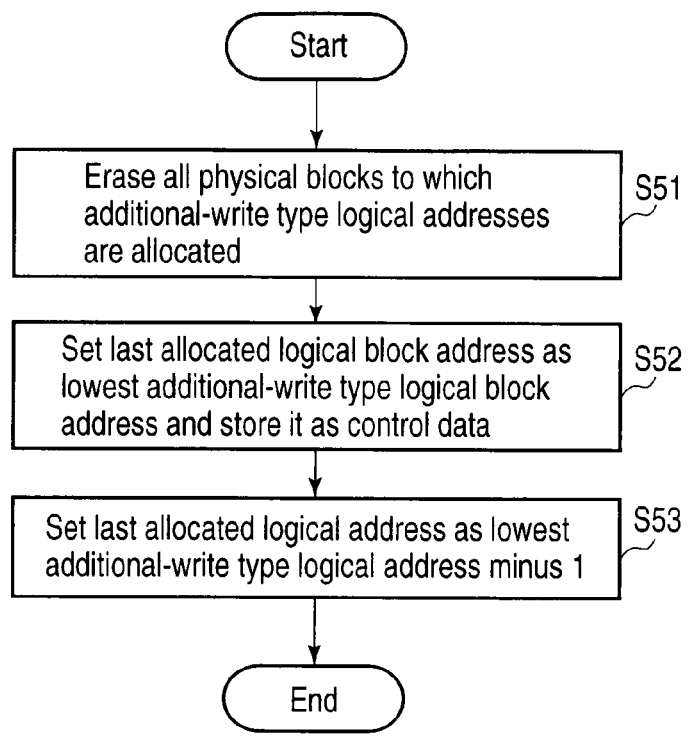
FIG. 25 is a flow chart on reception of a command for initializing an additional-write type logical address data storing physical block.
Figure 26:
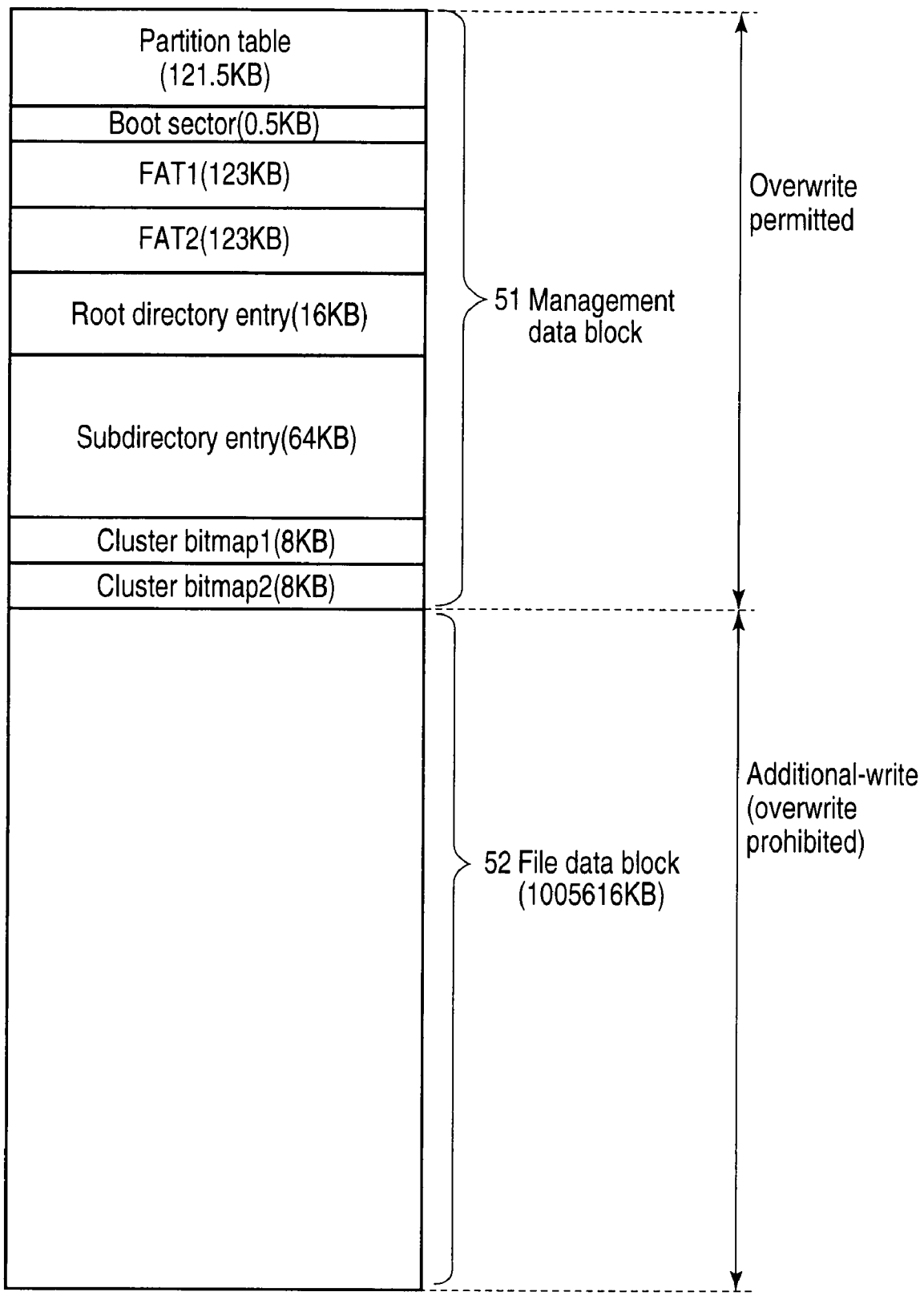
FIG. 26 is a diagram showing logical addresses to which bit map tables are allocated.

As shown in FIG. 25, in step S51, upon receipt of the command, controller 7 erases all physical blocks which store the data to which the additional-write type logical addresses are allocated. When all physical blocks are classified into those for storing data to which additional-write type logical addresses are allocated and those for storing data to which overwrite type logical addresses are allocated as one embodiment, all physical blocks for storing the data to which the additional-write type logical addresses are allocated are erased.

In step S52, the last allocated logical block address is set as the lowest additional-write type logical block address, and is stored in memory 6 as control data for controller 7.

Controller 7 writes the last allocated logical address on RAM 14 as the lowest additional-write type logical address minus 1.

The above processes forms a state in which no additional-write type address is allocated.

[3-2] Bitmap Table

Some file systems may create a so-called cluster bitmap table. The cluster bitmap table shows whether each cluster is allocated or not. For example, when a cluster is unallocated, "0" is described for the cluster number. When a cluster is allocated, "1" is described for the cluster number.

The cluster bit map table also belongs to the management data and is frequently rewritten. As shown in FIG. 26, logical addresses to be allocated to the cluster bitmap table are fixed and controller 7 deals with the logical addresses as overwrite type logical addresses. Dealing with the cluster bitmap table which is frequently rewritten as the management data facilitates optimization of a write type in accordance with data characteristics.

[3-3] Scheme for Modifying Range of Overwrite Type Logical Addresses

In memory card 2 according to one embodiment of the invention, the number of logical addresses which can be allocated to the management data is defined by a format with consideration of a storage capacity of memory 6. The capacity of the logical addresses which can be allocated to subdirectory entries is also defined in advance. A capacity (the number of overwrite type logical addresses) which can be allocated to the management data may need to increase when the capacity of the subdirectory entry is smaller than necessary. Functional extensions of file system 4 also may require an increase in overwrite type logical address capacity. For these purposes, the capacity of the overwrite type logical address can be preferably modified even without designing of a new memory card 2. Therefore, a command to modify overwrite type logical address capacity is provided in SD interfaces 5 and 11.

Figure 27:
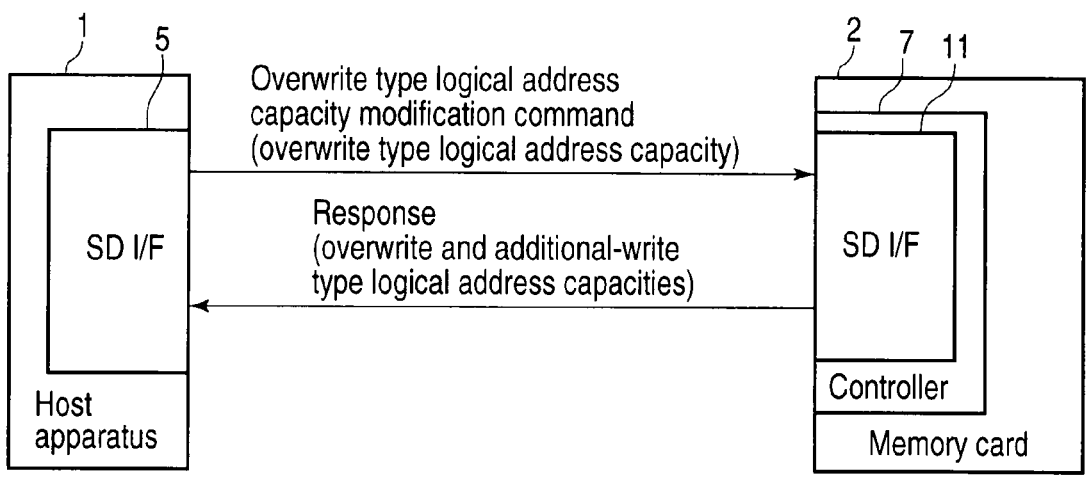
FIG. 27 is a diagram showing a configuration to modify a capacity of overwrite-type logical address.

FIG. 27 shows a diagram for configuration to modify a logical address.

As shown in FIG. 27, host 1 issues the overwrite type logical address capacity modification command to memory card 2. In the command, a capacity of an overwrite type logical address requested by host 1 is described as an argument. Upon receipt of the command, controller 7 updates control data related to the boundary of an overwrite type logical address. Memory card 2 transmits the overwrite type logical address capacity and the calculated capacity of the additional-write type logical addresses to host 1 as a response. Using the overwrite type logical address capacity modification command can easily modify the capacity of overwrite type logical addresses. Data for the new setting is stored in system data area 21.

After the boundary of the overwrite type logical address is modified, all the data in user data area 24 have unsecured values.

As described above, with host 1 (file system 4) and memory card 2 (controller 7), fixed logical addresses are allocated to the management data used in the FAT file system. The management data can be overwritten, and file data can be written only through the additional-write scheme. Optimization of the write type in accordance with data characteristics (amount and write frequency) can realize a high-speed write even in a large-capacity memory card 2.

Using a file system based on the FAT file system can realize host 1 and memory card 2 which are compatible with a conventional FAT file system.

[4] Advantages According to Present Embodiment

As described above, a memory system according to the embodiment can achieve the following advantages of [4-1] to [4-4].

[4-1] Decrease in file rewrite speed can be prevented, which is advantageous for high-speed operation.

As described with reference to FIG. 8, the memory system according to the present example includes at least a NAND flash memory (nonvolatile memory) 6 including memory space 50 which is formatted by host apparatus 1 (from outside) through the UDF file system (an additional-write type file system), and memory controller 7 for controlling NAND flash memory 6. When memory controller 7 is instructed to write data in an address which is equal to or smaller address of written data, it transmits a write protect error to host apparatus 1 (to outside). In other words, memory space 50 according to the present example is formatted only by a UDF additional-write type file system, which is a pure additional-write type file system.

As described above, in the present example, nonvolatile memory 6 includes memory space 50 which is only formatted by the UDF file system (an additional-write type file system). A simplified illustrative representation is memory space 50a shown in FIG. 28A.

Therefore, it is possible to prevent update of management data such as the FAT each time file data (actual data) constituting a file is updated, which would be the case in a memory space which is formatted by an overwrite type file system such as the FAT file system like memory space 50b shown in FIG. 28B. As a result, it is possible to avoid "copy-involving write" each time file data in NAND flash memory 6 is updated, which is advantageous for high-speed operation through prevention of decrease in file update speed.

[4-2] Memory blocks used in the two-level mode can be small, which allows for efficient usage of the memory space.

Further, advantages are appreciated through comparison between memory space 50a (an additional-write type UDF) shown in FIG. 28A and memory space 50b (an additional-write type FAT) shown in FIG. 28B.

Specifically, memory 50a (the additional-write type UDF) according to the present example allows all the memory space 50 to be used for additional-write and eliminates the necessity of overwrite-enable areas. For this reason, memory blocks used in two-level mode for overwrite-enable areas can be small, which realizes a merit of efficient usage of the memory area.

Another merit is that memory space 50b (the additional-write type FAT) is highly compatible with conventional FAT file systems.

[4-3] Generation of scattered free areas is avoided, which improves memory usage efficiency.

As described above, NAND flash memory 6 according to the present example includes memory space 50 which is only formatted by the UDF file system (the additional-write type file system). A simplified illustrative representation is memory space 50a shown in FIG. 28A.

As shown, memory space 50 thus formatted eliminates "copy-involving write" which would occur each time file data of NAND flash memory 6 is updated. For this reason, it is possible to avoid generation of scattered free areas, which advantageously improves memory usage efficiency.

Therefore, as shown, memory space 50a which is formatted only by the UDF file system (the additional-write type file system) achieves more efficient usage of memory 6 than memory space 50b which is formatted by the UDF and FAT file systems (the overwrite type and additional-write type file systems, respectively) or memory space 50c which is formatted by the FAT file system (the overwrite type file system).

[4-4] Usage in combination with the overwrite type file system can assure compatibility with host apparatus 1.

As described above, the relationship between the memory usage efficiency and combination of the overwrite type and additional type file systems (the UDF and FAT) is shown FIGS. 28A to 28C. On the other hand, since the relationship between the compatibility of host 1 and combination of the overwrite and additional-write type file systems (the UDF and FAT) is a reverse of the relationship between the memory usage efficiency and combination of the file systems shown FIGS. 28A to 28C, memory 50a seems to be disadvantageous in terms of compatibility with host 1.

The present example, however, can be combined with the overwrite type file system (for example, the FAT file system) to format memory space 50. A simplified illustrative representation is memory space 50b which is formatted by the UDF and FAT file systems (the overwrite type and additional-write type file systems, respectively) as shown in FIG. 28B.

Thus, the present example can be combined with the overwrite type file system (the FAT file system) to assure the compatibility with host apparatus 1.

It is expected that host apparatus 1 will support the UDF file system (overwrite type file system) to assure the compatibility in the future.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
   a nonvolatile memory corresponding to a memory space which consists of a group of logical addresses, the memory space being formatted from outside by an additional-write type file system; and
   a memory controller controlling the nonvolatile memory, wherein the memory controller is configured to
   (1) receive, from the outside, a first logical address and a request for writing to the first logical address;
   (2) determine whether the received first logical address is equal to or smaller than a second logical address associated with the first data which has been written in the nonvolatile memory;
   (3) output an error to the outside when the received first logical address is equal to or smaller than the second logical address; and
   (4) convert the first logical address into a physical address, and write second data to the nonvolatile memory using the physical address, when the received first logical address is larger than the second address, and
   wherein the first and second logical addresses belong to the group of the logical addresses.

2. The memory system according to claim 1, wherein the memory controller includes an interface which sets writable addresses in an address area of the memory space which is formatted by the additional-write type file system to an initial state.

3. The memory system according to claim 1, wherein when data of discontinuous addresses is written in an address area of the memory space from outside, sameness of data of skipped address stored in the nonvolatile memory before and after the discontinuous write is not assured.

4. The memory according to claim 1, wherein the memory controller includes means for allowing data write from outside on each initialization.

5. The memory according to claim 2, wherein the memory controller writes data to which logical addresses of the memory space formatted by the additional-write type file system is allocated in the nonvolatile memory in a multi-level mode.

6. The memory according to claim 2, wherein the additional-write type file system is a UDF file system.

7. The memory according to claim 2, wherein the nonvolatile memory is a NAND flash memory, and
the interface is a NAND interface.

8. The memory according to claim 1, wherein the memory controller further comprises:
a micro processing unit controlling the memory system;
a read only memory storing a program controlled by the micro processing unit; and
a random access memory used as a work area for the micro processing unit.

9. A memory controller controlling a nonvolatile memory corresponding to a memory space which consists of a group of logical addresses, the memory space being formatted from outside by an additional-write type file system, configured to
(1) receive, from the outside, a first logical address and a request for writing to first logical address;
(2) determine whether the received first logical address is equal to or smaller than a second logical address associated with first data which has been written in the nonvolatile memory;
(3) output an error to the outside when the received first logical address is equal to or smaller than the second logical address; and
(4) convert the first logical address into a physical address, and write second data to the nonvolatile memory using the physical address, when the first logical address is larger than the second logical address, and
wherein the first and second logical addresses belong to the group of the logical addresses.

10. The controller according to claim 9, wherein the memory controller includes an interface which sets writable addresses in an address area of the memory space which is formatted by the additional-write type file system to an initial state.

11. The controller according to claim 9, wherein when data of discontinuous addresses is written in an address area of the memory space from outside, sameness of data of skipped address stored in the nonvolatile memory before and after the discontinuous write is not assured.

12. The controller according to claim 9, wherein the memory controller includes means for allowing data write from outside on each initialization.

13. The controller according to claim 10, wherein the memory controller writes data to which logical addresses of the memory space formatted by the additional-write type file system is allocated in the nonvolatile memory in a multi-level mode.

14. The controller according to claim 10, wherein the additional-write type file system is a UDF file system.

15. The controller according to claim 10, wherein the nonvolatile memory is a NAND flash memory, and
the interface is a NAND interface.

16. The controller according to claim 10 further comprising:
a micro processing unit controlling the controller;
a read only memory storing a program controlled by the micro processing unit; and
a random access memory used as a work area for the micro processing unit.

* * * * *